(12) United States Patent
Braun et al.

(10) Patent No.: US 6,864,877 B2
(45) Date of Patent: Mar. 8, 2005

(54) DIRECTIONAL TACTILE FEEDBACK FOR HAPTIC FEEDBACK INTERFACE DEVICES

(75) Inventors: Adam C. Braun, Sunnyvale, CA (US); Louis B. Rosenberg, San Jose, CA (US); David F. Moore, San Carlos, CA (US); Kenneth M. Martin, Los Gatos, CA (US); Alex S. Goldenberg, Mountain View, CA (US)

(73) Assignee: Immersion Corporation, San Jose, CA (US)

( * ) Notice: Subject to any disclaimer, the term of this patent is extended or adjusted under 35 U.S.C. 154(b) by 174 days.

(21) Appl. No.: 09/967,496

(22) Filed: Sep. 27, 2001

(65) Prior Publication Data

US 2002/0080112 A1 Jun. 27, 2002

Related U.S. Application Data

(60) Provisional application No. 60/236,417, filed on Sep. 28, 2000, and provisional application No. 60/242,918, filed on Oct. 23, 2000.

(51) Int. Cl.[7] .................................................. G09G 5/00
(52) U.S. Cl. ....................... 345/156; 345/701; 345/702; 463/37
(58) Field of Search ................................ 345/156, 158, 345/159, 701, 702; 463/37, 38

(56) References Cited

U.S. PATENT DOCUMENTS

| | | | |
|---|---|---|---|
| 3,157,853 A | 11/1964 | Hirsch | |
| 3,220,121 A | 11/1965 | Cutler | |
| 3,497,668 A | 2/1970 | Hirsch | |

(List continued on next page.)

FOREIGN PATENT DOCUMENTS

| | | |
|---|---|---|
| EP | 265011 A1 | 4/1988 |
| EP | 0349086 | 1/1990 |
| EP | 0626634 A2 | 11/1994 |
| JP | H2-185278 | 7/1990 |
| JP | H4-8381 | 1/1992 |
| JP | H5-192449 | 8/1993 |
| JP | H7-24147 | 1/1995 |
| WO | WO9200559 | 1/1992 |
| WO | WO0103105 A1 | 1/2001 |
| WO | WO0113354 A1 | 2/2001 |
| WO | WO0124158 | 4/2001 |

OTHER PUBLICATIONS

U.S. Appl. No. 09/968,725, filed Sep. 28, 2001, Schena.
"Taking a Joystick Ride", Computer Currents, Tim Scannell, Nov. 1994, Boston Edition, vol. 9 No. 11.
"Coaxial Control Shaker Part No. C–25502," Safe Flight Instrument Corporation, 26 pages, Jul. 1, 1967; Revised Jan. 28, 2002.
Baigrie, "Electric Control Loading—A Low Cost, High Performance Alternative," Proceedings, pp. 247–254, Nov. 6–8, 1990.

(List continued on next page.)

*Primary Examiner*—Jimmy H. Nguyen
(74) *Attorney, Agent, or Firm*—Kilpatrick Stockton LLP

(57) ABSTRACT

Directional haptic feedback provided in a haptic feedback interface device. An interface device includes at least two actuator assemblies, which each include a moving inertial mass. A single control signal provided to the actuator assemblies at different magnitudes provides directional inertial sensations felt by the user. A greater magnitude waveform can be applied to one actuator to provide a sensation having a direction approximately corresponding to a position of that actuator in the housing. In another embodiment, the actuator assemblies each include a rotary inertial mass and the control signals have different duty cycles to provide directional sensations. For power-consumption efficiency, the control signals can be interlaced or pulsed at a different frequency and duty cycle to reduce average power requirements.

28 Claims, 8 Drawing Sheets

U.S. PATENT DOCUMENTS

| | | |
|---|---|---|
| 3,517,446 A | 6/1970 | Corlyon et al. |
| 3,902,687 A | 9/1975 | Hightower |
| 3,903,614 A | 9/1975 | Diamond et al. |
| 3,919,691 A | 11/1975 | Noll |
| 4,160,508 A | 7/1979 | Salsbury et al. |
| 4,236,325 A | 12/1980 | Hall et al. |
| 4,414,984 A | 11/1983 | Zarudiansky |
| 4,513,235 A | 4/1985 | Acklam et al. |
| 4,581,491 A | 4/1986 | Boothroyd |
| 4,599,070 A | 7/1986 | Hladky et al. |
| 4,706,294 A | 11/1987 | Ouchida |
| 4,708,656 A | 11/1987 | De Vries et al. |
| 4,713,007 A | 12/1987 | Alban |
| 4,731,603 A | 3/1988 | McRae |
| 4,795,296 A | 1/1989 | Jau |
| 4,868,549 A | 9/1989 | Affinito et al. |
| 4,885,565 A | 12/1989 | Embach |
| 4,891,764 A | 1/1990 | McIntosh |
| 4,930,770 A | 6/1990 | Baker |
| 4,934,694 A | 6/1990 | McIntosh |
| 5,019,761 A | 5/1991 | Kraft |
| 5,022,407 A | 6/1991 | Horch et al. |
| 5,035,242 A | 7/1991 | Franklin |
| 5,038,089 A | 8/1991 | Szakaly |
| 5,078,152 A | 1/1992 | Bond |
| 5,103,404 A | 4/1992 | McIntosh |
| 5,107,262 A | 4/1992 | Cadoz |
| 5,146,566 A | 9/1992 | Hollis, Jr. |
| 5,184,319 A | 2/1993 | Kramer |
| 5,186,629 A | 2/1993 | Rohen |
| 5,186,695 A | 2/1993 | Mangseth et al. |
| 5,203,563 A | 4/1993 | Loper, III |
| 5,212,473 A | 5/1993 | Louis |
| 5,240,417 A | 8/1993 | Smithson et al. |
| 5,271,290 A | 12/1993 | Fischer |
| 5,275,174 A | 1/1994 | Cook |
| 5,296,871 A | 3/1994 | Paley |
| 5,299,810 A | 4/1994 | Pierce |
| 5,309,140 A | 5/1994 | Everett |
| 5,334,027 A | 8/1994 | Wherlock |
| 5,354,162 A | 10/1994 | Burdea |
| 5,388,992 A | 2/1995 | Franklin |
| 5,399,091 A | 3/1995 | Mitsumoto |
| 5,405,152 A | 4/1995 | Katanics |
| 5,440,183 A | 8/1995 | Denne |
| 5,466,213 A | 11/1995 | Hogan |
| 5,547,382 A | 8/1996 | Yamasaki |
| 5,565,840 A | 10/1996 | Thorner |
| 5,580,251 A | 12/1996 | Gilkes |
| 5,583,478 A | 12/1996 | Renzi |
| 5,587,937 A | 12/1996 | Massie |
| 5,589,828 A | 12/1996 | Armstrong |
| 5,619,180 A | 4/1997 | Massimino |
| 5,631,861 A | 5/1997 | Kramer |
| 5,643,087 A | 7/1997 | Marcus |
| 5,661,446 A | 8/1997 | Anderson |
| 5,669,818 A | 9/1997 | Thorner |
| 5,684,722 A | 11/1997 | Thorner |
| 5,709,219 A | 1/1998 | Chen |
| 5,714,978 A | 2/1998 | Yamanaka |
| 5,734,373 A | 3/1998 | Rosenberg |
| 5,739,811 A | 4/1998 | Rosenberg |
| 5,742,278 A | 4/1998 | Chen et al. |
| 5,754,023 A | 5/1998 | Roston |
| 5,766,016 A | 6/1998 | Sinclair |
| 5,781,172 A | 7/1998 | Engel |
| 5,784,052 A | 7/1998 | Keyson |
| 5,785,630 A | 7/1998 | Bobick et al. |
| 5,790,108 A | 8/1998 | Salcudean |
| 5,805,140 A | 9/1998 | Rosenberg |
| 5,825,308 A | 10/1998 | Rosenberg |
| 5,857,986 A | 1/1999 | Moriyasu |
| 5,889,672 A | 3/1999 | Schuler |
| 5,894,263 A | 4/1999 | Shimakawa |
| 5,897,437 A | 4/1999 | Nishiumi |
| 5,914,705 A | 6/1999 | Johnson |
| 5,945,772 A | 8/1999 | Macnak |
| 5,973,670 A | 10/1999 | Barber |
| 5,984,880 A | 11/1999 | Lander |
| 5,986,643 A | 11/1999 | Harvill |
| 6,001,014 A | 12/1999 | Ogata et al. |
| 6,004,134 A | 12/1999 | Marcus |
| 6,044,646 A | 4/2000 | Silverbrook |
| 6,078,126 A | 6/2000 | Rollins |
| 6,088,017 A | 7/2000 | Tremblay |
| 6,088,019 A | 7/2000 | Rosenberg |
| 6,104,158 A | 8/2000 | Jacobus |
| 6,111,577 A | 8/2000 | Zilles et al. |
| 6,184,868 B1 | 2/2001 | Shahoian |
| 6,198,206 B1 | 3/2001 | Saarmaa |
| 6,211,861 B1 | 4/2001 | Rosenberg |
| 6,275,213 B1 | 8/2001 | Tremblay |
| 6,317,032 B1 | 11/2001 | Oishi |
| 6,422,941 B1 | 7/2002 | Thorner et al. |
| 6,424,333 B1 | 7/2002 | Tremblay |
| 6,563,487 B2 | 5/2003 | Martin |
| 2002/0030663 A1 | 3/2002 | Tierling |
| 2004/0056840 A1 * | 3/2004 | Goldenberg et al. ........ 345/156 |

OTHER PUBLICATIONS

Iwata, "Pen–based Haptic Virtual Environment," 0–7803–1363–1/93 IEEE, pp 287–292, 1993.

Russo, "The Design and Implementation of a Three Degree of Freedom Force Output Joystick," MIT Libraries Archives Aug. 14, 1990, pp. 1–131, May 1990.

Brooks et al., "Hand Controllers for Teleoperation—A State–of–the–Art Technology Survey and Evaluation," JPL Publication 85–11; NASA–CR–175890; N85–28559, pp. 1–84, Mar. 1, 1985.

Jones et al., "A perceptual analysis of stiffness," ISSN 0014–4819 Springer International (Springer–Verlag); Experimental Brain Research, vol. 79, No. 1, pp. 150–156, 1990.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25–44, May 2, 1993.

Snow et al., "Model–X Force–Reflecting–Hand–Controller," NT Control No. MPO–17851; JPL Case No. 5348, pp. 1–4, Jun. 15, 1989.

Ouh–Young, "Force Display in Molecular Docking," Order No. 9034744, p. 1–369, 1990.

Tadros, Control System Design for a Three Degree of Freedom Virtual Environment Simulator Using Motor/Brake Pair Actuators, MIT Archive © Massachusetts Institute of Technology, pp. 1–88, Feb. 1990.

Caldwell et al., "Enhanced Tactile Feedback (Tele–Traction) Using a Multi–Functional Sensory System," 1050–4729/93, pp. 955–960, 1993.

Adelstein, "Design and Implementation of a Force Reflecting Manipulandum for Manual Control research," DSC–vol. 42, Advances in Robotics, Edited by H. Kazerooni, pp. 1–12, 1992.

Gotow et al, "Controlled Impedance Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSV–vol. 42, Advances in Robotics, pp. 55–61, ASME 1992.

Russo, "Controlling Dissipative Magnetic Particle Brakes in Force Reflective Devices," DSC–vol. 42, Advances in Robotics, pp. 63–70, ASME 1992.

Kontarinis et al., "Display of High–Frequency Tactile Information to Teleoperators," Telemanipulator Technology and Space Telerobotics, Won S. Kim, Editor, Proc. SPIE vol. 2057, pp. 40–50, Sep. 7–9, 1993.

Patrick et al., "Design and Testing of A Non–reactive, Fingertip, Tactile Display for Interaction with Remote Environments," Cooperative Intelligent Robotics in Space, Rui J. deFigueiredo et al., Editor, Proc. SPIE vol. 1387, pp. 215–222, 1990.

Adelstein, "A Virtual Environment System For The Study of Human Arm Tremor," Ph.D. Dissertation, Dept. of Mechanical Engineering, MIT, Jun. 1989.

Bejczy, "Sensors, Controls, and Man–Machine Interface for Advanced Teleoperation," Science, vol. 208, No. 4450, pp. 1327–1335, 1980.

Bejczy, "Generalization of Bilateral Force–Reflecting Control of Manipulators," Proceedings Of Fourth CISM–IFToMM, Sep. 8–12, 1981.

McAffee, "Teleoperator Subsystem/Telerobot Demonsdtrator: Force Reflecting Hand Controller Equipment Manual," JPL D–5172, pp. 1–50, A1–A36, B1–B5, C1–C36, Jan. 1988.

Minsky, "Computational Haptics: The Sandpaper System for Synthesizing Texture for a Force–Feedback Display," Ph.D. Dissertation, MIT, Jun. 1995.

Jacobsen et al., "High Performance, Dextrous Telerobotic Manipulator With Force Reflection," Intervention/ROV '91 Conference & Exposition, Hollywood, Florida, May 21–23, 1991.

Shimoga, "Finger Force and Touch Feedback Issues in Dexterous Telemanipulation," Proceedings of Fourth Annaul Conference on Intelligent Robotic Systems for Space Exploration, Rensselaer Polytechnic Institute, Sep. 30–Oct. 1, 1992.

IBM Technical Disclosure Bullein, "Mouse Ball–Actuating Device With Force and Tactile Feedback," vol. 32, No. 9B, Feb. 1990.

Terry et al., "Tactile Feedback In A Computer Mouse," Proceedings of Fourteenth Annual Northeast Bioengineering Conference, University of New Hampshire, Mar. 10–11, 1988.

Howe, "A Force–Reflecting Teleoperated Hand System for the Study of Tactile Sensing in Precision Manipulation," Proceedings of the 1992 IEEE International Conference on Robotics and Automation, Nice, France, May 1992.

Eberhardt et al., "OMAR—A Haptic display for speech perception by deaf and def–blind individuals," IEEE Virtual Reality Annual International Symposium, Seattle, WA, Sep. 18–22, 1993.

Rabinowitz et al., "Multidimensional tactile displays: Identification of vibratory intensity, frequency, and contractor area," Journal of The Acoustical Society of America, vol. 82, No. 4, Oct. 1987.

Bejczy et al., "Kinesthetic Coupling Between Operator and Remote Manipulator," International Computer Technology Conference, The American Society of Mechanical Engineers, San Francisco, CA, Aug. 12–15, 1980.

Bejczy et al., "A Laboratory Breadboard System For Dual–Arm Teleoperation," SOAR '89 Workshop, JSC, Houston, TX, Jul. 25–27, 1989.

Ouh–Young, "A Low–Cost Force Feedback Joystick and Its Use in PC Video Games," IEEE Transactions on Consumer Electronics, vol. 41, No. 3, Aug. 1995.

Marcus, "Touch Feedback in Surgery," Proceedings of Virtual Reality and Medicine The Cutting Edge, Sep. 8–11, 1994.

Bejczy, et al., "Universal Computer Control System (UCCS) For Space Telerobots," CH2413–3/87/0000/0318501.00 1987 IEEE, 1987.

Aukstakalnis et al., "Silicon Mirage: The Art and Science of Virtual Reality," ISBN 0–938151–82–7, pp. 129–180, 1992.

Eberhardt et al., "Including Dynamic Haptic Perception by The Hand: System Description and Some Results," DSC–vol. 55–1, Dynamic Systems and Control: vol. 1, ASME 1994.

Gobel et al., "Tactile Feedback Applied to Computer Mice," International Journal of Human–Computer Interaction, vol. 7, No. 1, pp. 1–24, 1995.

Pimentel et al., "Virtual Reality: through the new looking glass," $2^{nd}$ Edition; McGraw–Hill, ISBN 0–07–050167–X, pp. 41–202, 1994.

"Cyberman Technical Specification," Logitech Cyberman SWIFT Supplement, Apr. 5, 1994.

Ouhyoung et al., "The Development of A Low–Cost Force Feedback Joystick and Its Use in the Virtual Reality Environment," Proceedings of the Third Pacific Conference on Computer Graphics and Applications, Pacific Graphics '95, Seoul, Korea, Aug. 21–24, 1995.

Kaczmarek et al., "Tactile Displays," Virtual Environment Technologies.

* cited by examiner

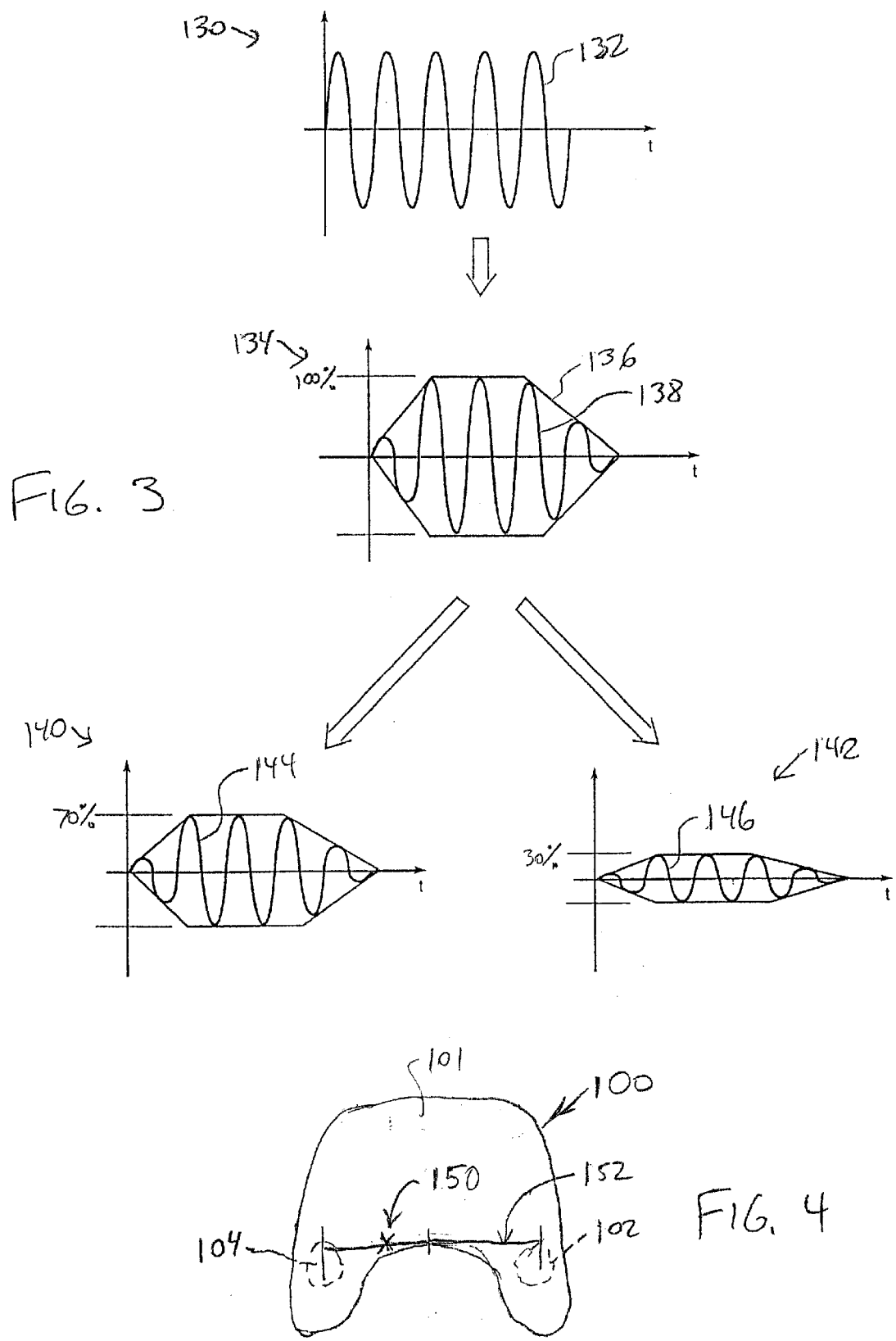

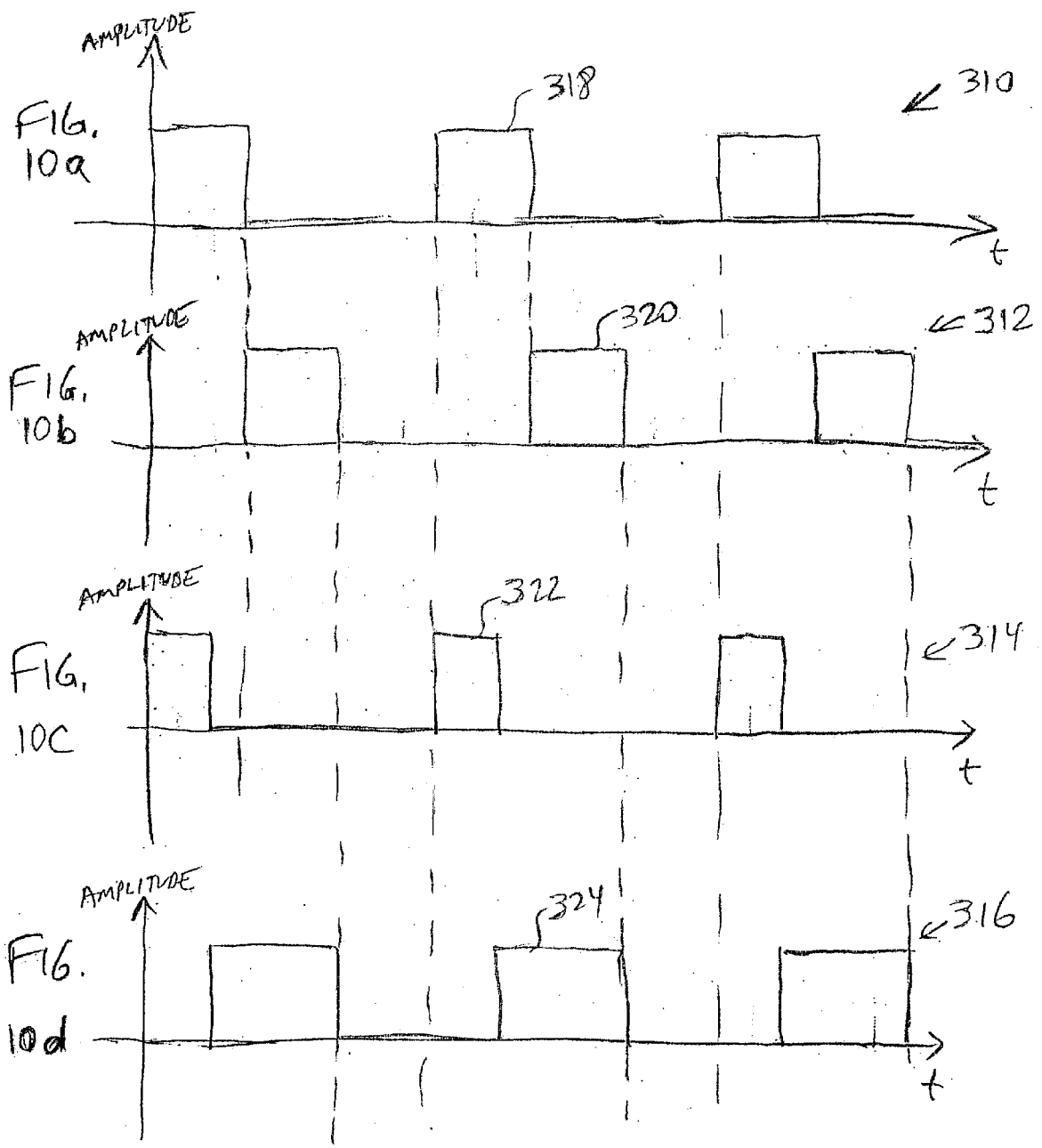

DIRECTIONAL TACTILE FEEDBACK FOR HAPTIC FEEDBACK INTERFACE DEVICES

CROSS REFERENCE TO RELATED APPLICATIONS

This application claims the benefit of U.S. Provisional Applications Nos. 60/236,417, filed Sep. 28, 2000, and entitled, "Providing Directional Tactile Feedback and Actuator for Providing Tactile Sensations", and No. 60/242,918, filed Oct. 23, 2000, entitled, "Directional and Power-efficient Tactile Feedback," both of which are incorporated herein by reference in their entireties.

BACKGROUND OF THE INVENTION

The present invention relates generally to interface devices for allowing humans to interface with computer systems, and more particularly to computer interface devices that allow the user to provide input to computer systems and allow computer systems to provide haptic feedback to the user.

A user can interact with an environment displayed by a computer to perform functions and tasks on the computer. Common human-computer interface devices used for such interaction include a mouse, joystick, trackball, gamepad, steering wheel, stylus, tablet, pressure-sensitive sphere, or the like, that is connected to the computer system. Typically, the computer updates the environment in response to the user's manipulation of a physical manipulandum such as a joystick handle or mouse, and provides visual and audio feedback to the user utilizing the display screen and audio speakers. The computer senses the user's manipulation of the user manipulandum through sensors provided on the interface device that send locative signals to the computer. In some interface devices, kinesthetic force feedback or tactile feedback is also provided to the user, more generally known herein as "haptic feedback." These types of interface devices can provide physical sensations which are felt by the user manipulating a user manipulandum of the interface device. One or more motors or other actuators are coupled to the housing or the manipulandum and are connected to the controlling computer system. The computer system controls output forces in conjunction and coordinated with displayed events and interactions by sending control signals or commands to the actuators.

Many low-cost haptic devices provide inertially-grounded tactile feedback, in which forces are transmitted with respect to an inertial mass and felt by the user, rather than kinesthetic feedback, in which forces are output directly in the degrees of freedom of motion of a moving manipulandum with respect to a physical (earth) ground. For example, many currently-available gamepad controllers include a spinning motor with an eccentric mass, which outputs force sensations to the housing of the controller in coordination with events occurring in a game. In some haptic mouse devices, pins, buttons, or the housing of the mouse can be actuated in accordance with interaction of a controlled cursor with other graphical objects, which the user feels by touching those housing areas.

One problem with such inexpensive haptic controllers is their limited ability to convey different types of force sensations to the user. A device that provides more flexibility for the developer in tuning and adjusting the feel of haptic sensations is more desirable. In addition, inertial controllers currently available can only provide output pulses and vibrations in the general directions of the rotating mass. The sensations thus feel to the user as if they are not output in any particular direction, but are simply output on the housing of the device. However, many events in games and other computer-implemented environments are direction-based and would benefit from a directionality to haptic sensations which current inertial haptic devices cannot provide.

SUMMARY OF THE INVENTION

The present invention is directed toward providing directional haptic feedback in a haptic feedback interface device. Inventive power-efficiency features for the haptic devices used for such directional feedback are also described.

More particularly, an interface device of the present invention provides directional haptic feedback to a user, the interface device in communication with a host computer. The device includes a housing physically contacted by the user and at least one sensor for detecting user input. At least two actuator assemblies each includes a moving inertial mass, and are positioned in the housing to cause directional inertial sensations on the housing. A single control signal is provided to each of the actuator assemblies at different magnitudes to provide the directional inertial sensations felt by the user. Preferably, a greater magnitude of the waveform is applied to a particular one of the actuator assemblies to provide a sensation having a direction approximately corresponding to a position of that particular actuator assembly in the housing, e.g. a greater magnitude is applied to a left actuator assembly to provide a sensation having a left direction etc.

A local processor can be included that receives a high level command from the computer and controls the actuator assemblies. The high level command can include a balance parameter that indicates how to divide an output current between the actuator assemblies to provide a desired location for the directional inertial sensation along an axis between the actuator assemblies. The actuator assemblies can oscillate said inertial mass linearly, or rotate an eccentric rotating mass. The control signal can be divided into two control signals, one being out of phase with the other and each sent to one of the actuator assemblies. A method of the present invention similarly allows output of directional inertial sensations.

In another aspect of the present invention, an interface device provides directional haptic feedback to a user and includes a housing physically contacted by the user and at least one sensor for detecting user input. At least two actuator assemblies each include a rotary inertial mass that is driven uni-directionally. The actuator assemblies are positioned in the housing to cause directional inertial sensations on the housing, where a control signal is provided to each of the actuator assemblies at a different duty cycle to provide the directional inertial sensations felt by the user. For example, a commanded magnitude of the control signal can be applied to a left one of the actuator assemblies to provide a sensation having a left direction; similar control can be provided for a right direction. High levels command including a balance parameter can be used, indicating how to divide output vibration magnitudes between the actuator assemblies. One of the control signals can be out of phase with the other. The control signals can also be interlaced such that the control signals are never on at the same time. Alternatively, when one of the control signals is on at the same time as the other, one or both signals are pulsed at a predetermined frequency and duty cycle to reduce average power requirements of the actuator assemblies. A method of the present invention similarly allows output of directional inertial sensations.

The present invention advantageously provides directional tactile feedback sensations for a tactile feedback device using low cost actuators. These sensations allow for a much greater variety of sensations in these types of haptic devices, allowing the experience of playing a game or interacting with other types of computer applications to be more fulfilling for the user. Power efficiency features also allow low-power device embodiments to provide the directional haptic sensations disclosed herein.

These and other advantages of the present invention will become apparent to those skilled in the art upon a reading of the following specification of the invention and a study of the several figures of the drawing.

BRIEF DESCRIPTION OF THE DRAWINGS

FIG. 3 is a functional diagram illustrating a control method of the present invention for use with the two actuator embodiment of FIGS. 2a–2b;

FIG. 4 is a diagrammatic representation of the interface device and the possible approximate locations at which the user may perceive a resultant inertial force;

FIGS. 10a, 10b, 10c and 10d are graphs illustrating control signals in a control method of the present invention to provide directional tactile feedback.

DETAILED DESCRIPTION OF PREFERRED EMBODIMENTS

Figure 1:
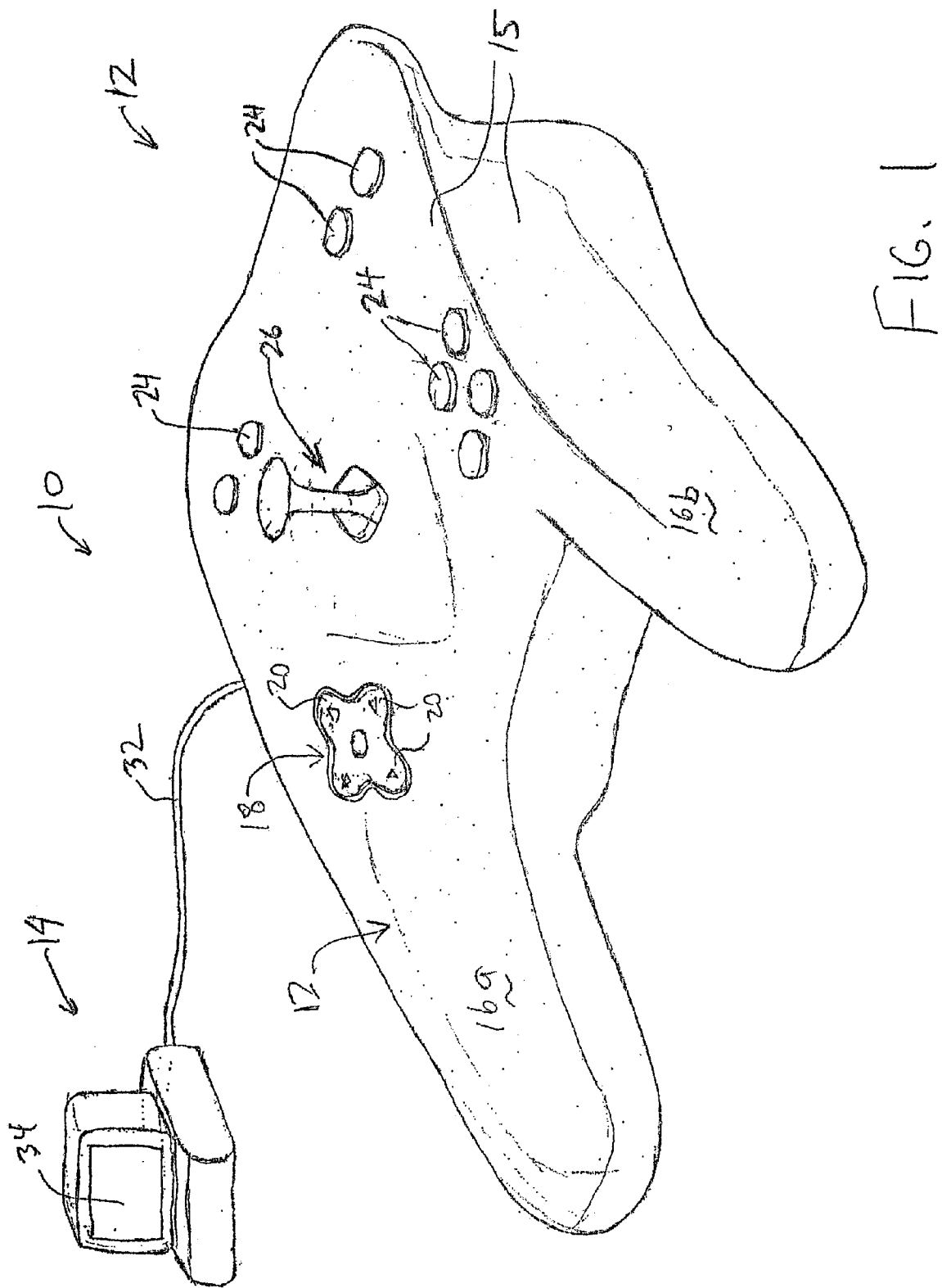
FIG. 1 is a perspective view of a gamepad haptic feedback system suitable for use with the present invention.

FIG. 1 is a perspective view of a haptic feedback interface system 10 suitable for use with the present invention and capable of providing input to a host computer based on the user's manipulation of a device and capable of providing haptic feedback to the user of the system based on events occurring in a program implemented by the host computer. System 10 is shown in exemplary form as a gamepad system 10 that includes a gamepad interface device 12 and a host computer 14.

Gamepad device 12 is in the form of a handheld controller, of similar shape and size to many gamepads currently available for video game console systems. A housing 15 of the interface device 10 is shaped to easily accommodate two hands gripping the device at the gripping projections 16a and 16b. In the described embodiment, the user accesses the various controls on the device 12 with his or her fingers. In alternate embodiments, the interface device can take a wide variety of forms, including devices that rest on a tabletop or other surface, standup arcade game machines, laptop devices or other devices worn on the person, handheld or used with a single hand of the user, etc.

A direction pad 18 can be included on device 12 to allow the user to provide directional input to the host computer 14. In its most common implementation, the direction pad 18 is approximately shaped like a cross or disc having four extensions or directional positions radiating from a central point at a 90-degree spacing, where the user can press down on one of the extensions 20 to provide a directional input signal to the host computer for the corresponding direction.

One or more finger joysticks 26 can be included in device 12 that project out of a surface of the housing 15 to be manipulated by the user in one or more degrees of freedom. For example, the user can grasp each of grips 16a and 16b of the device and use a thumb or finger to manipulate the joystick 26 in two degrees of freedom (or three or more degrees of freedom in some embodiments). This motion is translated into input signals provided to the host computer 14, and can be different signals than those provided by the direction pad 18. In some embodiments, additional linear or spin degrees of freedom can be provided for the joystick. In other embodiments, a sphere can be provided instead of or in addition to the joystick 26, where one or more portions of the sphere can extend out of left, right, top and/or bottom sides of the housing 15 so that the sphere may be rotated in place by the user within two rotary degrees of freedom and operate similarly to a joystick, as described in detail in copending U.S. application Ser. No. 09/565,207, incorporated herein by reference in its entirety.

Instead of or in addition to buttons 24, joystick 26, and direction pad 18, other controls may be placed within easy reach of the hands grasping the housing 15. For example, one or more trigger buttons can be positioned on the underside of the housing and can be pressed by the fingers of the user. Other controls can also be provided on various locations of the device 12, such as a dial or slider for throttle control in a game, a four- or eight-way hat switch, knobs, trackballs, a roller or sphere, etc. Any of these controls can also be provided with haptic feedback, such as tactile feedback. For example, embodiments of buttons, direction pads, and knobs having force feedback are described in U.S. Pat. Nos. 6,184,868, and 6,154,201, both incorporated herein by reference in their entireties. The forces can be colocated such that the user feels the forces in the degree of freedom of movement of the button or direction pad; or, the button, direction pad, or other control can be provided with tactile sensations such as vibrations.

Furthermore, the housing itself which is contacted by the user when the user operates the device preferably provides tactile feedback, as described in greater detail below. A moveable part of the housing can also provide tactile feedback. Thus, both the housing can provide tactile feedback and the directional pad 18 (or other controls) can provide separate tactile feedback. Each other button or other control provided with haptic feedback can also provide tactile feedback independently from the other controls.

Interface device 12 is coupled to host computer 14 by a bus 32, which can be any of several types of communication media. For example, a serial interface bus, parallel interface bus, or wireless communication link can be used (radio, infrared, etc.). Specific implementations can include Universal Serial Bus (USB), IEEE 1394 (Firewire), RS-232, or other standards. In some embodiments, the power for the actuators of the device can be supplied or supplemented by power transmitted over the bus 32 or other channel, or a power supply/storage device can be provided on the device 12.

The interface device 12 includes circuitry necessary to report control signals to the host computer 14 and to process command signals from the host computer 14. For example, sensors (and related circuitry) can be used to sense and report the manipulation of the controls of the device to the host computer. The device also preferably includes circuitry that receives command signals from the host and outputs tactile sensations in accordance with the command signals using one or more device actuators. Gamepad 12 preferably includes actuator assemblies which are operative to produce forces on the housing of the gamepad 12. This operation is described in greater detail below with reference to FIG. 2.

Host computer 14 is preferably a video game console, personal computer, workstation, or other computing or electronic device which typically includes one or more host microprocessors. One of a variety of home video game systems, such as systems available from Nintendo, Sega, or Sony, a television "set top box" or a "network computer", etc. can be used. Alternatively, personal computers, such as an IBM-compatible or Macintosh personal computer, or a workstation, such as a SUN or Silicon Graphics workstation, can be used. Or, the host 14 and device 12 can be included in a single housing in an arcade game machine, portable or handheld computer, vehicular computer, or other device. Host computer system 14 preferably implements a host application program with which a user is interacting via peripherals and interface device 12. For example, the host application program can be a video or computer game, medical simulation, scientific analysis program, operating system, graphical user interface, drawing/CAD program, or other application program. Herein, computer 14 may be referred as providing a "graphical environment,", which can be a graphical user interface, game, simulation, or other visual environment. The computer displays "graphical objects" or "computer objects," which are not physical objects, but are logical software unit collections of data and/or procedures that may be displayed as images by computer 14 on display device 34, as is well known to those skilled in the art. Suitable software drivers which interface software with haptic feedback devices are available from Immersion Corporation of San Jose, Calif.

Display device 34 can be included in host computer 14 and can be a standard display screen (LCD, CRT, flat panel, etc.), 3-D goggles, projection display device (e.g., projector or heads-up display in a vehicle), or any other visual output device. Typically, the host application provides images to be displayed on display device 34 and/or other feedback, such as auditory signals. For example, display screen 34 can display graphical objects from a GUI and/or application program.

In other embodiments, many other types of interface or control devices may be use with the present inventions described herein. For example, a mouse, a trackball, a joystick handle, steering wheel, knob, stylus, grip, touchpad, or other device can benefit from inertial haptic sensations as described herein. In addition, other types of handheld devices are quite suitable for use with the presently-described inventions, such as handheld remote control device or cellular phone or handheld electronic device or computer can be used with the haptic feedback components described herein. The sensations described herein can, for example, be output perpendicularly from a device's surface or can be output on a joystick handle, trackball, stylus, grip, wheel, or other manipulatable object on the device, or in a desired direction or sweep. For example, a mouse suitable for use with the present invention is described in co-pending application Ser. No. 09/967,494, filed concurrently herewith, and entitled, "Actuator for Providing Tactile Sensations and Device for Directional Tactile Sensations," incorporated herein by reference in its entirety.

In operation, the controls of interface device 12 are manipulated by the user, which indicates to the computer how to update the implemented application program(s). An electronic interface included in housing 15 of device 12 can couple the device 12 to the computer 14. The host computer 14 receives the input from the interface device and updates an application program in response to the input. For example, a game presents a graphical environment in which the user controls one or more graphical objects or entities using the direction pad 18, joystick 26 and/or buttons 24. The host computer can provide force feedback commands and/or data to the device 12 to cause haptic feedback to be output by the device.

Figure 2B:
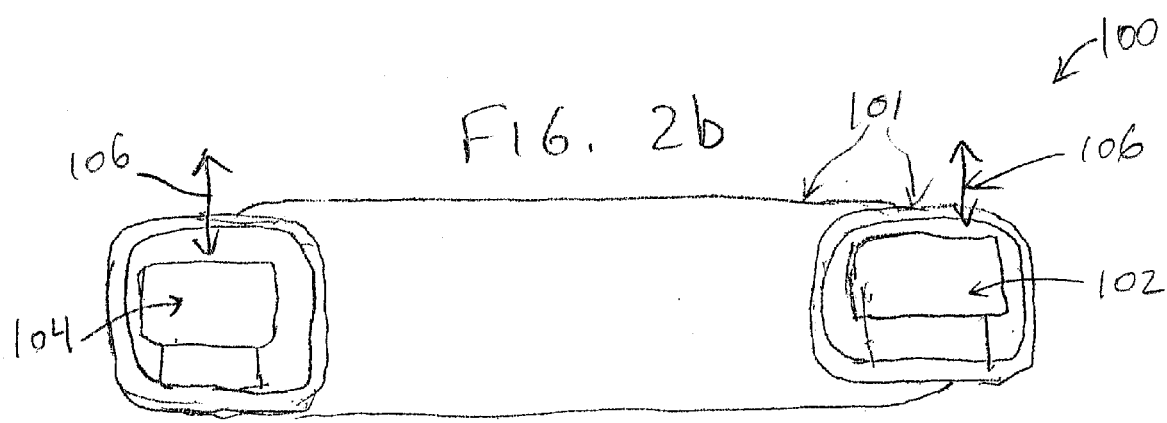
FIGS. 2a and 2b are top plan sectional and side elevational views, respectively, of an embodiment of the haptic interface device that includes two actuators to provide directional inertial feedback.
Figure 2A:
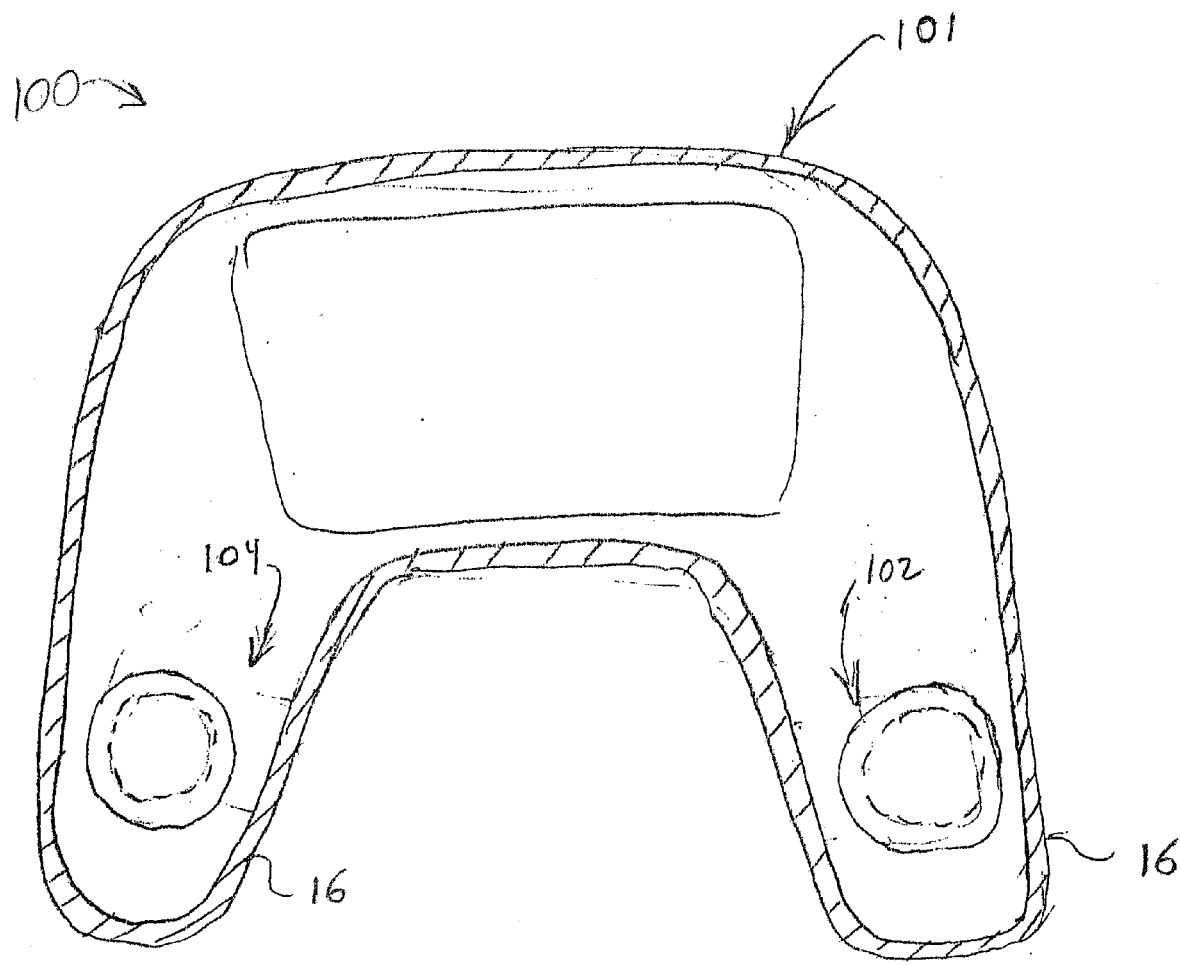

FIGS. 2a and 2b are top plan sectional and side elevational views, respectively, of an embodiment 100 of device 12 including two actuators for use with one embodiment of the present invention for directional inertial feedback. The embodiment shown may be used with any inertial interface device, but may be best suited to handheld devices which are grasped by the user with two hands at different parts of the device housing. The embodiment is described as a gamepad for explanatory purposes. Gamepad housing 101 encloses a gamepad tactile interface device 12, which is manipulated by the user to provide input to a host computer system. The user typically operates the device by grasping each grip 16 with one hand and using fingers to manipulate the input devices on the central part of the housing 101.

Housing 101 preferably includes two harmonic drive actuator assemblies 102 and 104. These actuator assemblies can be implemented in any of a variety of ways. Most of the suitable actuator assemblies provide an inertial mass that can be harmonically oscillated, and also include a centering spring force on the inertial mass to allow efficient and highly-controllable inertial sensations. In one embodiment, the actuator assemblies described herein with reference to FIGS. 2–8 can be used. In other embodiments, the actuator assemblies 102 and 104 can be the harmonic drive actuator assemblies described in copending application Ser. No. 09/585,741, filed Jun. 2, 2000, and copending application Ser. No. 09/965,097, filed concurrently herewith, entitled, "Device and Assembly For Providing Linear Inertial Sensations", both incorporated herein by reference in their entireties. Those referenced actuator assemblies provide a rotary motor (or other actuator) coupled to a flexure that causes an inertial mass to oscillate approximately linearly, thereby providing tactile feedback. The inertial mass can be the motor itself. The actuators are controlled harmonically, similar to the actuators described herein, e.g. with a periodic control signal such as a sine wave. The inertial mass can be oscillated in any direction; for example, one desirable direction is up and down, as indicated by arrows 106. In other embodiments, other types of actuators can be used, such as voice coil (moving coil) actuators. In yet other embodiments, rotary inertial masses can be used, such as an eccentric mass provided on a shaft of a rotary motor, as described below.

The harmonic drive actuator assemblies 102 and 104 are preferably positioned with the maximum spatial displacement between them that is allowed by the device. For example, in the gamepad embodiments, the assemblies 102 and 104 can be placed within different hand grips 16 of the gamepad. This allows the perception of directional forces to be more easily experienced by the user. The actuator assemblies 102 and 104 are also preferably the same in their relevant characteristics: actuator size, spring stiffness, inertial mass, and damping (if provided). This allows the inertial forces to be about the same at each end of the device and allows the balancing of direction to be more effective. Other embodiments can include different spacing and/or sizing of the actuator assemblies.

FIG. 3 is a functional diagram illustrating a control method of the present invention for use with the two actuator embodiment 100 described with reference to FIGS. 2a–2b to provide directional tactile feedback that can be spatially placed by the user at a location between the two actuator assemblies. A time-vs-current graph 130 of FIG. 3a depicts an initial control waveform 132 which provides a base vibration to be output by the actuators of the device and has a desired frequency, duration, and magnitude. The waveform is a forcing function that harmonically drives a mass both positively and negatively along the axis. This waveform can be adjusted as desired with various parameters. For example, as shown in the graph 134 of FIG. 3b, an envelope 136 can be applied to provide a waveform 138 that has an adjusted magnitude at desired levels at different points in the duration of the vibration. In other applications, no envelope need be applied. Envelopes, attack and fade parameters and other force shaping techniques are described in U.S. Pat. No. 5,959,613, incorporated herein by reference in its entirety.

When the control waveform 138 is to be output to the actuator assemblies (or a control signal is output that implements the control waveform 138), the same basic waveform shape is provided to each actuator assembly, but the magnitudes are scaled so that the commanded current is divided between the two actuator assemblies 102 and 104. To provide a vibration or other inertial force sensation that has no perceived direction to the user, both actuator assemblies are provided with an equal amount of current, so that equal magnitude vibrations are output from each actuator. If, however, the inertial sensation is to have a perceived direction, then one actuator is provided with more current than the other, i.e. greater magnitude inertial forces are output by one actuator than the other actuator. Graphs 140 and 142 illustrate control waveforms derived from the waveform of graph 134 sent to the actuator assemblies 102 and 105. The graphs indicate a situation in which a "left" direction is to be perceived by the user. The waveform 144 of graph 340 is a 70% magnitude of the commanded 100% magnitude and is sent to the left actuator 104 on the left side of the device. The waveform 146 of graph 142 has a 30% commanded magnitude (the remaining amount of current) and is sent to the actuator 102 on the right side of the device. If a right direction is to be output, then the actuator 102 on the right side of the device is provided with the greater amount of current (larger magnitude). The user perceives a stronger vibration on one side of the device as a directional vibration.

The tactile sensation directionality can be useful in many applications, such as games. If for example, the user's vehicle in a game crashes into a barrier on the left, the left actuator can output a stronger vibration to indicate the direction of this collision. If a player's character is punched on his left side, a left vibration can be output.

Depending on the division of magnitude between the two actuators, the user perceives the output inertial sensations at a location somewhere between the two actuator assemblies; the stronger one force is, the closer to that actuator assembly the user perceives the resultant force to be output. For example, FIG. 4 shows a representation of the gamepad 100, where the actuator assemblies 102 and 104 are represented. An axis 152 indicates the possible approximate locations at which the user may perceive a resultant inertial force. From the waveform commands of FIG. 3, the left actuator assembly 104 is outputting a greater force (70%) than the right actuator assembly 102 (30%), so the user perceives the inertial forces to be output approximately at location 150 of the housing 101, which is located closer to the left actuator in proportion to its greater magnitude. This effective since the inertial sensations are commanded by the same basic waveform and thus are output in synchronization with the same frequency. The division of magnitude can be changed in any desired way to output a perceived direction at any point along the axis 152.

One way of commanding the direction in this way is to specify a "balance" parameter. For example, the host computer can provide high level commands to a local processor on the device 12. The high level commands can include parameters such as frequency, magnitude, envelope attack and fade parameters, and a balance parameter. The balance parameter, for example, can be specified as a number in a range. For example, a range of 0 to 90 can be used to simulate a vector force direction. A 45 value indicates exact balance between the actuator assembly outputs, so that inertial forces are felt equally on both sides of the device. A value below 45 indicates greater force magnitude on the left side, and so on to the 0 value, which indicates 100% of the commanded current is controlling the left actuator and the right actuator has no output. A 90 value controls the right actuator to have full output and the left actuator to have no output. Alternatively, a percentage can be specified and applied to a default actuator assembly, such as the left one; e.g., a value of 65 would thus indicate that 65% of the commanded magnitude should go to the left actuator, while the remaining 35% of the commanded magnitude would go to the right actuator. A local processor can perform the scaling of the two output control signals in accordance with the commanded balance and provide the appropriate scaled signal to each actuator assembly 102 and 104.

Alternatively, the host computer can directly command the balance feature by sending scaled control signals to each actuator directly, or by directly instructing a local processor to send host-transmitted control signals to each of the actuators.

An important feature of the embodiment 100 is that both actuator assemblies preferably remain synchronized and in phase. A single waveform is used to control both actuators, but the magnitude of the waveforms is changed to indicate a direction or off-balance feeling to the inertial forces. Thus, the masses of each of the actuator assemblies oscillates in unison, except that one of the masses accelerates faster and moves a greater distance from the origin position of the mass, causing greater force from that actuator assembly. This allows the directionality to be better perceived by the user because a single sensation is being created with spatial placement. In other embodiments, the actuators can be unsynchronized, but this tends to provide less directionality to the force sensations.

Additional actuators can be included in other embodiments. For example, two actuators can be provided on the left side, and two actuators can be provided on the right side to increase magnitude vibration. Or, additional actuators can be positioned at front, back, top, or bottom positions to provide additional directions to the tactile feedback. Preferably, each actuator receives the same waveform at a desired fraction of the available power to achieve the directionality. For example, if three actuator assemblies are provided in a triangular configuration, the perceived location of a resultant inertial force sensation is placed somewhere between all three actuator assemblies, effectively adding a second dimension to the force location. This location can be adjusted by adjusting the magnitude of current to each actuator assembly appropriately.

Another important directional effect that can be achieved with the embodiment 100 is a "sweep" of inertial forces. Such a sweep causes the balance of current between actuator assemblies to be continuously changed so that the perceived location of the inertial forces is smoothly moving from right to left or left to right in a two-actuator embodiment (or in other directions as implemented). For example, the local processor can be commanded by a high level sweep command to change the balance parameter continuously and evenly from 0 to 90 (using the convention described above) over a specified time duration. By changing the time duration, a fast sweep or a slower sweep can be commanded. The user then feels inertial forces starting at the left of the device and moving approximately along axis 152 toward the right, and ending at the right actuator, as the local processor changes the percentage of commanded current that each actuator assembly receives during the sweep. Thus, for example, if the user's car in a game gets collided on the right side, an inertial vibration can be quickly (e.g. over 1–2 seconds) swept from the right side to the left side to convey the direction of this collision. In an embodiment including three or more actuator assemblies, the force location can be swept in two dimensions by dividing current so that the perceived location is moving in a desired path between all of the actuators.

Other control features can include the use of phase shifts between the left and right actuator assemblies in addition (or alternatively) to the balance control between left and right actuator assemblies. For example, a phase shift of 90 degrees between the control waveforms sent to each of the actuators (and thus between the oscillations of the inertial mass) can give the user the impression of a doubled frequency, with an alternating beating effect (left-right). This can allow higher magnitude force sensations at a perceived higher frequency because the large displacements of the inertial mass associated with a low frequency are still occurring, but the resultant felt by the user is the higher frequency. Also, the resonance frequency can be useful. For example, if the resonance frequency of the actuator assemblies is about 40 Hz, a strong peak magnitude occurs at 40 Hz, and another strong peak at 80 Hz by running the two (same-type) actuator assemblies 90 degrees out of phase.

Furthermore, a small phase shift, such as 5 to 10 degrees, feels to the user like the master frequency but each pulse feels a little stronger because the user has the impression that each impulse of force lasts longer. In addition, a larger phase shift, such as 10 to 30 degrees, can give the user an interesting sensation of a "stutter step," i.e., a quick pop-pop of force, during each cycle of a vibration. Phase can also be sent to device as a parameter in a high level command.

Finally, a large phase shift of 180 degrees can cause tactile sensations to be very interesting to the user, since while the inertial mass of one actuator is traveling up and hitting a travel limit, the other inertial mass of the other actuator is traveling down and hitting the lower limit. This can impose a torque about the center of the gamepad or other interface device, e.g. a feeling like the entire gamepad is rotating about a center point approximately on axis 152. On one cycle, the torque is in one rotational direction, and on the next cycle, the direction of the torque reverses, thus providing an alternating torque. This sensation can feel more intense to the user than when the inertial masses are moving in phase. In another embodiment, a square wave can be commanded which has been normalized, e.g. provided only in one direction, such as the positive direction to cause the inertial mass to move only in one direction from its origin position. That waveform can then be sent 180 degrees out of phase between the two actuator assemblies. This can result in a clockwise beating torque, where the torque never switches direction. Alternatively, if the waveform is instead normalized to a negative direction, a counterclockwise beating torque results.

In another embodiment, the left-right inertial sensations from actuator assemblies 102 and 104 can be coordinated with stereo (left-right) audio that is, for example, output by the host computer. For example, an airplane can be flying over the user in a game or audio-video presentation on a host computer, television, or other device, where the sound of the airplane is output starting from a left speaker and moving over to a right speaker to present a positional audio effect. Force sensations output by the left and right actuator assemblies can, in coordination, start their output on the left side and move over to the right side of the interface device in unison with the sound. The force sensations can also be synchronized with displayed visual images, such as a panning camera view. In some embodiments, the magnitude of the force sensations can also be correlated to the loudness of the sound, for example. The host computer can command the force sensations to be synchronized with audio or video that the host is also controlling.

All of the above-described tactile effects, and variations thereof, can be combined in various ways to achieve a desired effect. A wide variety of tactile effects are thus possible using the control schemes of actuator assemblies of the present invention.

Figure 5B:
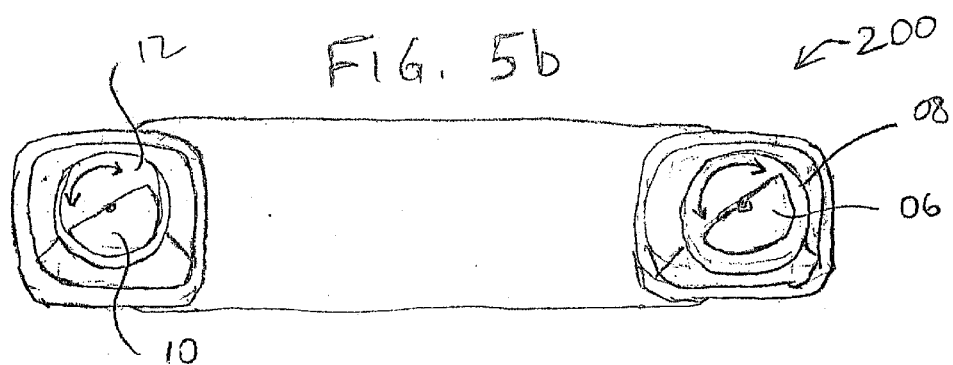
FIGS. 5a and 5b are top plan sectional and side elevational views, respectively, of another embodiment of the haptic interface device including two actuators and rotating inertial masses.
Figure 5A:
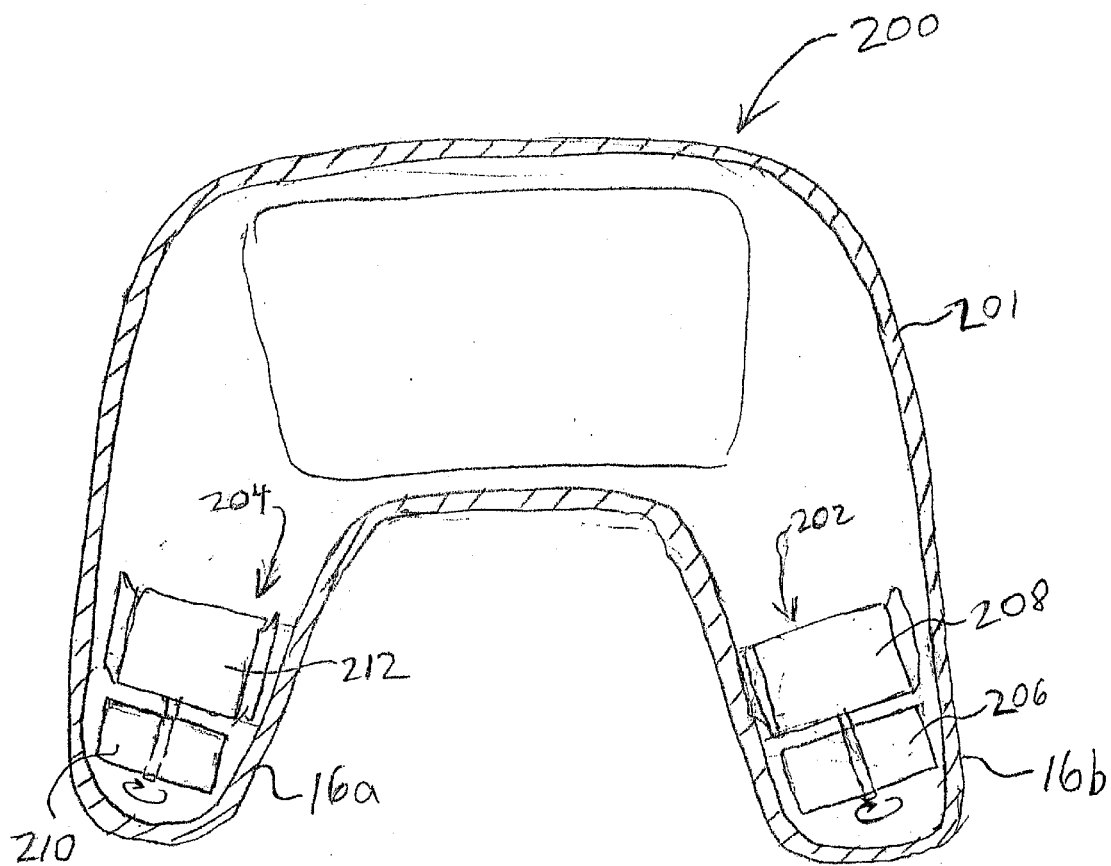

FIGS. 5a and 5b are top plan sectional and side elevational views, respectively, of another embodiment 200 of device 12 including two actuators for use with another embodiment of the present invention for directional inertial feedback. Gamepad housing 201 includes two actuator assemblies 202 and 204. In the above embodiment, the actuator assemblies include an inertial mass that can be linearly harmonically oscillated; in the present embodiment described in FIGS. 5a and 5b, the actuator assemblies 202 and 204 include rotary inertial masses, where an eccentric rotating mass (ERM) 206 is coupled to a rotating shaft of an actuator 208 in assembly 202 in the right grip 16b, and where an eccentric rotating mass (ERM) 210 is coupled to a rotating shaft of an actuator 212 in assembly 204 in the left grip 16a. Actuator 208 is rigidly (or compliantly) coupled to the housing 201 in grip 16a, and actuator 212 is rigidly (or compliantly) coupled to the housing 201 in grip 16b. Eccentric masses 206 and 210 can be wedge-shaped, cylinder-shaped, or otherwise shaped. When rotated, the masses cause the housing 201 to vibrate as the eccentric inertial mass moves within its range of motion.

The harmonic drive actuator assemblies 202 and 204 are preferably positioned with the maximum spatial displacement between them that is allowed by the device. For example, in the gamepad embodiments, the assemblies 202 and 204 can be placed within different hand grips 16a and 16b of the gamepad. This allows the perception of directional forces to be more easily experienced by the user. In other embodiments, the assemblies 202 and 204 can be positioned in other areas of the housing, although still preferably separated by a significant spatial distance, e.g. on opposite sides of the housing. The actuator assemblies 202 and 204 can be the same in their relevant characteristics: actuator size, inertial mass, and damping (if provided) to allow the inertial forces to be experienced about the same at each end of the device and allows the directional sensations to be effective. In other embodiments, actuator assemblies having different sizes or other characteristics can be used.
Controlling Tactile Sensations with Unidirectional ERM Motors The inertial rotary actuator assemblies described for FIGS. 5a–5b can output vibrations and jolts to the user of the interface device 12 when the inertial masses are rotated. Co-pending patent application Ser. No. 09/669,029, filed Sep. 25, 2000, incorporated herein by reference in its entirety, describes in detail methods for controlling a unidirectionally-driven rotary inertial actuator assembly. In these methods, frequency and magnitude of a periodic haptic effect can be varied independently and displayed on a single degree of freedom actuator, such as (but not restricted to) an ERM actuator.

Many standard gamepad vibrotactile devices rotate ERMs at a fixed magnitude and frequency, the two of which are tightly coupled. For example, high frequency vibrations are necessarily high magnitude, while low frequency vibrations are necessarily low frequency. The method of control described for use in the embodiment of FIGS. 5a–5b and described in the above-referenced application allows independent variation of magnitude and frequency of a 1 degree-of-freedom (DOF), unidirectionally-driven rotary actuator. i.e., no expensive bi-directional current drivers need be employed, since the ERM need only be driven in one rotary direction. The technique is significant because it enables an ERM to create complex vibrations, like decaying sinusoids or superimposed waveforms. An ERM in prior devices had a magnitude that was roughly linearly coupled to its speed. The present invention, utilizing no extra clutches, circuitry, or mechanical parts and using only these control methods (e.g. implemented in firmware of a local microprocessor or other controller of the device 12), can play a range of frequencies at any amplitude using an ERM motor. Note that the control methods described herein can be applied not only to rotational motors but other types of 1 DOF actuators, rotational and linear, including moving magnet motors, solenoids, voice coil actuators, etc.

In this method of control, a frequency command, a magnitude command, and a function (i.e. sine wave, square wave, triangle wave) can be supplied as parameters or inputs to the firmware. This follows an existing Immersion/DirectX protocol used in personal computers such as PC's, in which a vibration is controlled with magnitude, frequency, and function type parameters (and additional parameters, if desired). The equivalent of these parameters can be supplied in other embodiments.

Figure 6:
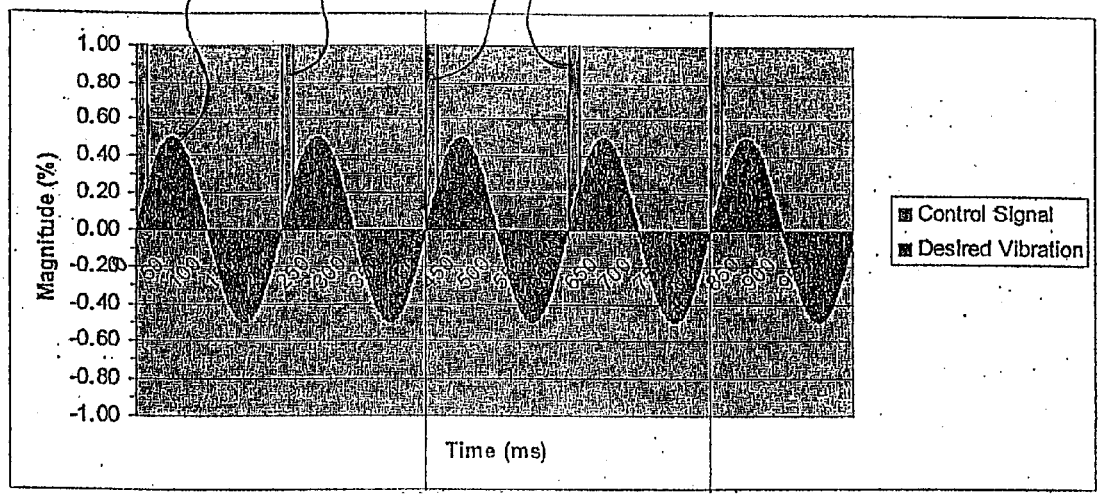
FIG. 6 is a graph showing a time vs. magnitude relationship of a desired sine wave vibration and a control signal for providing that vibration.
Figure 7:
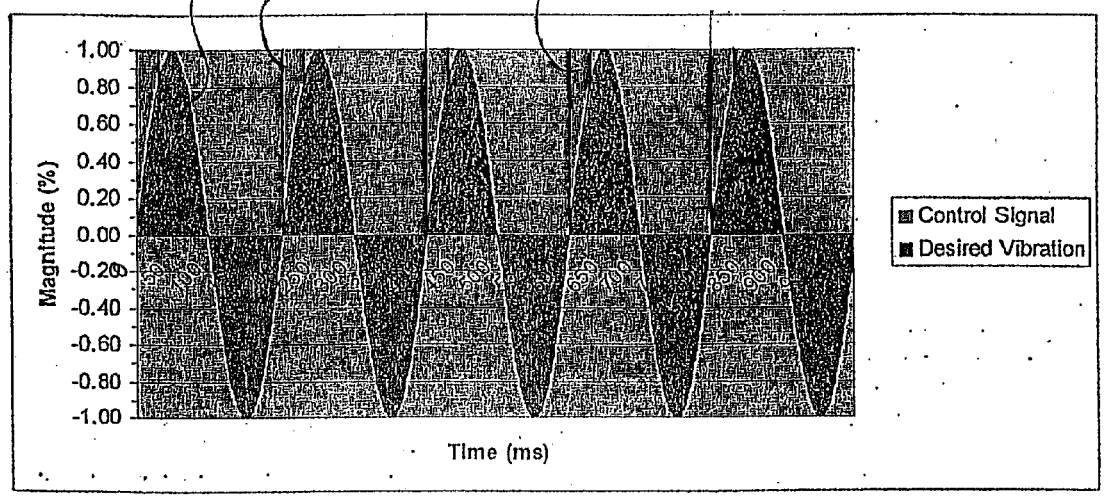
FIG. 7 is a graph showing another example of a time vs. magnitude relationship of a desired sine wave vibration and a control signal for providing that vibration.

An example is illustrated in the graph 250 shown in FIG. 6, showing a time vs. magnitude relationship. A sine wave 252 of frequency 5 Hz and 50% magnitude is shown as the desired vibration to be output by the device (this, and all subsequent similar figures, capture 1 second of input and output signals). The present control method determines where each period of the waveform begins (or should begin), then raises a control signal 254 to a high or "on" level for a specific duration once per period; the control signal 254 is "off" or low during the other times. The "on" level energizes the motor and causes the ERM 206 or 210 to rotate in its single rotary direction. Thus, the periodic control signal has a frequency based on the desired (commanded) frequency. By pulsing the actuator once per period using control signal 254, the perception of a vibration with specified frequency is conveyed to the user. The control signal can be raised to a high level at the beginning of a period, as shown, or at a different time within the period.

Magnitude of the periodic effect is portrayed by adjusting a duty cycle of the control signal, e.g. the duration at each period ("on-time per period") of the control signal 254. The control signal 254 is either on or off, but the amount of time per period for which the control signal remains on is determined by the magnitude command or parameter. In FIG. 6, a sine wave with 50% of the possible magnitude is requested. According to the present invention, this requested magnitude generates a control signal 254 that comes on every 250 ms for 15 ms duration. For comparison, a 100% magnitude waveform with the same frequency is offered in FIG. 7, which shows a similar graph 260 to graph 254. The control signal 264 comes on at the same interval as the control signal 254 described above, since the frequency command has not changed. However, the control signal 264 stays on twice as long to produce the feeling in the user of twice the magnitude of vibration. The longer that the control signal is on, the longer the actuator spends accelerating. In our case, the ERM reaches a larger angular velocity and, since force is proportional to the square of angular velocity, larger forces are perceived at the user's hand. Preferably, the mass is never allowed to stop rotating, so that static friction need be overcome only once, at the start of rotation. If the control signal remains on too long, the rotating mass will make multiple revolutions and eventually reach its natural (resonant) frequency. At that point, the user will perceive the natural frequency of the system and not the commanded frequency.

Thus, according to the present invention, 1) how often the control signal comes on depends directly on frequency command, and 2) how long the control signal remains on (control signal on-time) is related to the magnitude command. The determination of the on-time of the control signal can be accomplished in different ways. Two different ways are presented here. First, on-time can be regulated as a "percentage of period." If the control signal comes on for a fixed percentage of each period, as frequency increases, on-time per period decreases. Yet the control signal comes on more often. The end result is that the control signal spends the same amount of time on each second, no matter what the frequency. This technique offers the advantage that, as frequency increases, constant power is added to the actuator, and perceived magnitude stays the same over the frequency range.

A problem with this "percentage of period" technique for commanding a desired vibration is that in many embodiments it may not work well at lower frequencies. At low frequencies (e.g., less than 2 Hz in some embodiments), too much power is delivered to the actuator at once. For example, if all the power from a 1 second period is delivered in a continuous 125 ms at the beginning of the period, during this on-time, the rotating actuators make several revolutions while the control signal is held high, so that vibrations (pulses) output during this 125 ms are perceived by the user at the frequency of the actuator's rotation speed, not the commanded frequency. The vibration output by the device thus may not correspond with the commanded (low) frequency.

A second method of the present invention can avoid this problem at low frequencies and thus may provide a more suitable way to output vibrations for many ERM vibrotactile devices. The second method sets the control signal high for a fixed maximum amount of time per period, not a percentage of the period. Thus, the on-time for 100% magnitude for any frequency is the same. The on-time for commanded magnitudes less than 100% are lower in proportion to the amount of the commanded magnitude under 100%. This effectively establishes a maximum on-time per period, prohibiting the actuator from coming on long enough to make multiple revolutions during one continuous on-time. If the actuator is allowed to make multiple revolutions (e.g., more than about 2 or 3 in some embodiments), the user will perceive a higher frequency based on the rotation speed of the actuator rather than the commanded frequency (e.g., which might be less than 10 Hz), so this method prevents that result. In some embodiments, a request of 100% magnitude at a lower frequency for a particular motor can be equated with the on-time that causes the mass to rotate just under the number of revolutions that cause the user to feel more than one pulse for a single period (such as 2–3 revolutions); this on-time can be determined empirically. A drawback to the second technique is that as frequency increases, the separate on-times get closer together, and the actuator is eventually, in effect, requested to remain on for longer than one period. At that point, the control signal is always being asserted, the mass rotates continuously, and frequency and magnitude no longer vary independently.

Since the two techniques for mapping magnitude to on-time of the control signal are good for different portions of the frequency range, one preferred embodiment combines or blends the two techniques to avoid the drawbacks in each method. In the preferred combination method, the second method is used only when commanded frequencies are below a particular blend threshold frequency and the first method can be used for commanded frequencies above that threshold frequency. Blending is possible even if the magnitude of the control signal also varies. First, the blend threshold is chosen based on dynamics of the system; the blend frequency is the frequency at which the on-time will be the longest, so a blend frequency should be chosen that will provide one vibration pulse (e.g. less than two mass revolutions) per period for an on-time corresponding to 100% magnitude at that frequency. For example, when using the large motor/mass combination as described above, 10 Hz can be used as a blend threshold frequency. For commanded frequencies above 10 Hz, the first method ("percentage of period") is used to calculate the on-time of the control signal, and for commanded frequencies below 10 Hz, the second method ("fixed time per period") can be used. Other thresholds can be used in other embodiments. To blend the two methods, scalars are chosen so that maximum magnitude for the two methods matches at the blend threshold frequency, i.e. the transition between methods is smooth. For example, a 25 ms control signal on-time at 10 Hz may generate a 10 Hz, 100% magnitude vibration. If the commanded frequency is approaching the blend frequency from below 10 Hz, then the "percentage of period" method is scaled to generate 25 ms on-times at 10 Hz, and those scalars used are retained and applied to this method for frequencies above 10 Hz. Depending on the desired effect, more advanced blending techniques can be used such as those that mimic band pass filters in the region of the blend, or low pass/high pass combinations on either side of the blend threshold frequency.

A different method to allow the command of magnitude independent of frequency is to vary the amplitude of the control signal 254 proportionally to requested magnitude, rather than having only two levels for the control signal. This can be performed alone or in conjunction with either or both of the first and second methods described above. For example, other types of waveforms having varying amplitude might be used as control signals (sine wave, triangle wave, etc.). One efficient way to set or vary the amplitude of the control signal is to provide pulse-width modulation (PWM) during the chosen on-time for control signals as presented above, or to vary the control signal duty cycle during the on-time using some other method. However, PWM may require a separate PWM module, which can add cost to the device. To avoid a PWM scheme, the first and second methods described above can be implemented by bit-banging, in which the local microprocessor outputs the control signal directly to the actuators without using a PWM module. Bit-banging does not allow the control signal magnitude to be directly controlled, but removes the requirement for a PWM module and potentially reduces processor or interface device cost.

The techniques described above for independently varying the magnitude and frequency of a vibration can be used on multiple actuators simultaneously, as in the embodiment of FIGS. 5a–5b. Additional inventive features for this control technique are described below.

Interlacing Control Signals for Power Efficiency

The control signal described above is used to control magnitude and frequency of output vibrations independently of each other. This control method can be used for multiple actuators, such as actuator assemblies 202 and 204. For example, both assemblies 202 and 204 can be activated simultaneously, each using a dedicated control signal.

One problem with operating multiple actuator assemblies simultaneously is that significant amounts of power are required to drive the actuators. In some embodiments, a smaller amount of available power may restrict the use of multiple actuator assemblies. For example, if the interface device 12 is powered from the host computer 14 over a communication channel such as USB that also provides a limited amount of power, and does not have its own dedicated power supply, the amount of available power to operate the actuator assemblies is quite restricted. Or, in the case of an interface device 12 that has only a wireless link to the host computer, batteries (or other portable power storage device) with limited power are used in the interface device to drive the actuators. In many cases with such power restrictions, less compelling haptic sensations are output when using two or more actuator assemblies simultaneously.

Figure 8A:
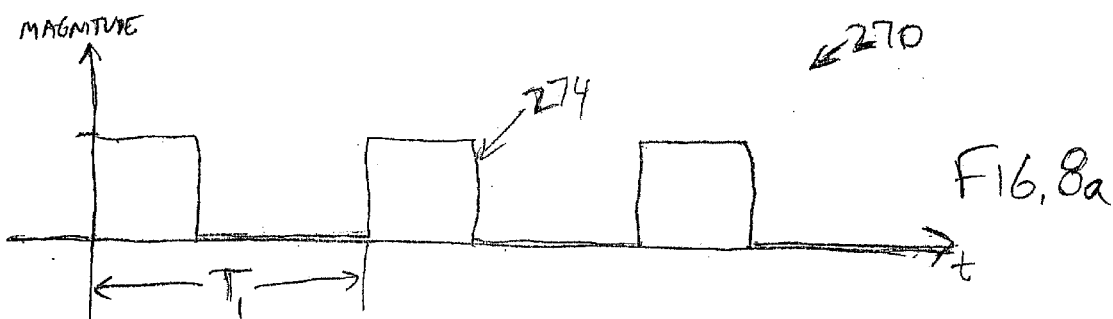
FIGS. 8a and 8b are graphs showing control signals for rotating the masses by the two different actuator assemblies and to independently control magnitude and frequency.
Figure 8B:
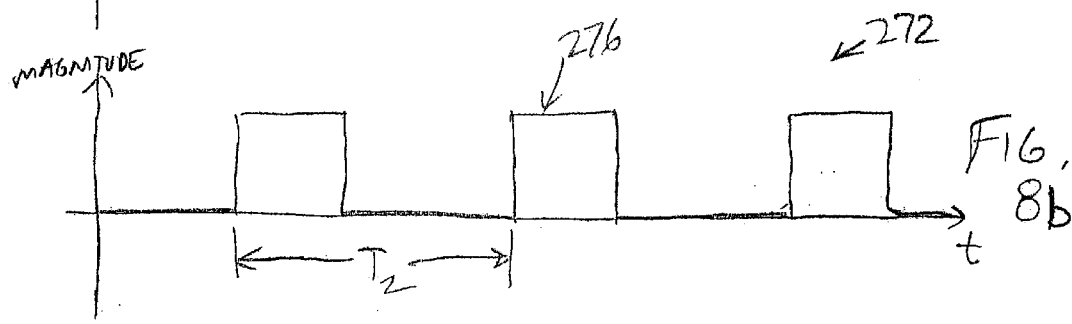

One method of the present invention allows two actuator assemblies to be operated simultaneously with a restricted available power budget. FIGS. 8a and 8b are graphs 270 and 272 showing control signals for rotating the ERMs, as described above, to independently control magnitude and frequency. Graph 270 shows the control signal 274 applied to one actuator assembly (e.g. assembly 202), and graph 272 shows the control signal 276 applied to the other actuator assembly (e.g. assembly 204). Control signals 274 and 276 have the same frequencies and periods T1 and T2. Control signal 274 has an on-time when the signal is high and an off-time when the signal is low, where the duty cycle is shown to be about 40%. While the control signal 274 is on, all or most of the available power is used to rotate the motor and thus provide a high-magnitude vibration. However, while control signal 274 is on, control signal 276 remains off. Control signal 276 comes on at a point when control signal 274 is off and signal 276 goes off before control signal 274 comes back on. Thus, control signal 276 is sufficiently phase-shifted from signal 274 so that the control signals are never on at the same time. This allows all the available power to be used for a single actuator at any one time, and the available power need not be divided between the two actuator assemblies 202 and 204.

Alternatively, control signal 276 can be made to lag only a small amount behind the control signal 274. This can be useful in cases where an ERM may require more power to start up rotating from rest (or other condition), but requires less power to remain rotating. For example, if the required start up current for both ERMs is greater than the available power budget, the required start up current for one ERM plus the required rotating current for the other ERM may be within the available power budget, thus allowing a second ERM to be started up very soon after the first ERM is started up and rotating. In some embodiments, the less interlaced the control signals, the more effective the vibration the user feels, since the resulting vibrations from each actuator assembly are more synchronized and less likely to "wash" each other out.

The control signals 274 and 276 can be varied in frequency and duty cycle (their on-time widths shifted) to produce varying vibration magnitudes as described above with reference to FIGS. 6 and 7. When so varied, the control signals are preferably maintained at the same frequency and duty cycle. This produces vibrations that are non-directional to the user, e.g. output as if from the entire housing, equal on both sides of the housing.

The control signals used in the method described above with respect to FIGS. 6 and 7 preferably do not have greater than a 50% duty cycle, since in many embodiments this would cause the actuator assembly to being operating at its natural frequency rather than the commanded frequency, e.g. the user feels the frequency of the ERM spinning continuously, not the commanded frequency. Thus, this method can be effective and allocating power to provide the strongest possible vibrations on a limited power budget, since interlacing is possible. Thus, this interlacing method allows independent control of magnitude and frequency of vibrations output by two actuators in a power-efficient scheme.

Figure 9A:
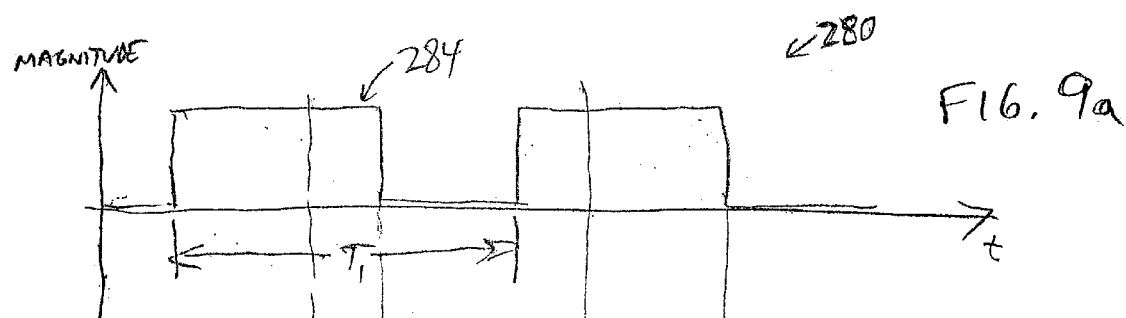
FIGS. 9a, 9b, and 9c are graphs illustrating a power allocation method of the present invention for control signals having different frequencies and/or overlap.
Figure 9B:
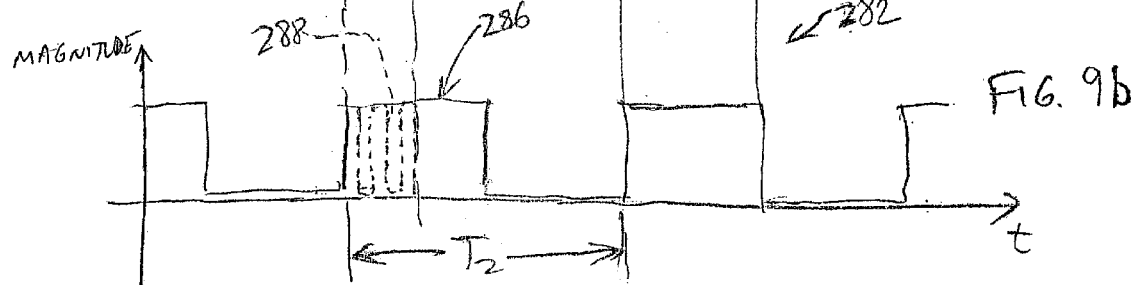

FIGS. 9a and 9b are graphs 280 and 282 illustrating a power allocation method of the present invention for control signals having different frequencies and/or overlap. Graph 280 illustrates a control signal 284 having a particular frequency and period T1, and graph 282 illustrates a control signal 286 having a particular frequency and period T2. The on-times of the signals overlap for an amount of time A, which is typically different for each period. Overlap may be unavoidable in some circumstances where a larger than 50% duty cycle is required or when the control signals are of different frequencies and/or duty cycles. For example, one actuator assembly 202 may be commanded to output a vibration at one frequency, while the other actuator assembly 204 may be commanded to output a vibration at a different frequency, to achieve a particular haptic sensation as felt by the user.

Figure 9C:
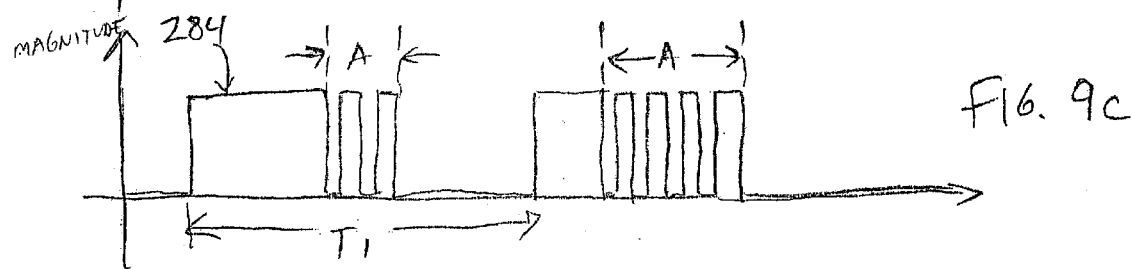

To allow a restricted power budget to be used in such a situation according to the present invention, the control signal is preferably turned off and on at a predetermined duty cycle and frequency during the time A of the overlap. This allows the average power consumption for each actuator to be reduced during those times when both actuators are being operated, and thus permits the available power budget to be efficiently used. For example, as shown in FIG. 9c, the control signal 284 is pulsed at a particular duty cycle and higher frequency during the overlap time period A, which allows the power requirements for control signal 284 to be reduced during that overlap. This is effectively a PWM type of control. This causes the actuator vibration output magnitude to be reduced (which is only slightly noticeable to the user). Meanwhile, the control signal 286 is also pulsed at a particular duty cycle and frequency (as shown by the dotted line 288 in FIG. 6b) during the overlap period. The available power is thus shared between the two actuator assemblies to cause a reduced output by each actuator within the available power budget. The shown frequencies of the control signals during the overlap are exaggerated in the figures to be lower than the actual frequencies that can be used.

The duty cycle and/or frequency at which the control signal is pulsed during the overlap period can be determined from the operating characteristics of the interface device 12, e.g. the characteristics of the actuators, ERM's, amplifiers, etc. A duty cycle can be chosen which reduces the power requirements of the control signal to a desired level that allows both actuators to operate within the power budget during the overlap, e.g. the effective overlap magnitude can be 75% of the full magnitude when the control signal remains on continuously. There is typically no need to arrange the control signals so that the pulses during the overlap period are not on at the same time. This is due to the relatively high frequency of the control signals, which allows components in the drive circuit such as capacitors to charge sufficiently to maintain the desired power level even though both control signals are high. In other embodiments, the control signals during the overlap period can be arranged, if possible, to be on at alternating times so that the control signals are not on simultaneously. The frequency of the controls signals during the overlap period is chosen based on the ability of the driver circuits with capacitors and other energy storage components to maintain the desired power level.

In some embodiments, the duty cycle of the control signals during the overlap period can be adjusted based on the frequencies or periods T of the two control signals. For example, in general, the smaller the period T1 and T2 of the control signals (and the higher the frequencies), the more power is required to operate the actuators. If either or both control signal has a small period, then the duty cycle of the control signals during the overlap can be reduced to consume less power, i.e. cause a lesser effective magnitude during the overlap period. In some embodiments, if the period T1 or T2 is very long, the ERM may gain momentum during the latter part of the on-time and require less power to rotate, and this can be taken into account when determining a duty cycle of the control signal during the overlap period. In some embodiments, the duty cycle can be increased for high frequency control signals so that the high frequency vibrations don't get "washed out" by lower frequency vibrations output by the other actuator.

The control signals can each have a different duty cycle and/or frequency during the overlap period based on individual characteristics of the actuator assemblies. In some embodiments, only one control signal is pulsed during the overlap period.

A local processor (see FIG. 11) may control how to phase shift the control signals and/or pulse the control signals during overlap periods. For example, in the alternating on-times embodiment of FIGS. 5a and 5b, a microprocessor can monitor when control signals are sent and can only send one control signal when other control signal is off.

The power-efficient control methods described above can also be used in other embodiments having other types of actuators which can be controlled with similar control signals or other signals with on-times.

Directional Sensations using Rotary Inertial Actuator Assemblies

The control methods described above can be used to control magnitude and frequency of output vibrations independently of each other in a power-restricted device. This control method can also be used in conjunction with methods of outputting directional inertial haptic sensations described above.

FIGS. 10a, 10b, 10c and 10d are graphs 310, 312, 314, and 316, respectively, illustrating control signals in a control method of the present invention for use with the two actuator embodiment described with reference to FIGS. 5a–15b to provide directional tactile feedback, in this case, tactile feedback that can be spatially placed by the user at a location between the two actuators. Graphs 310 and 312 illustrate control signals 318 and 320 which are similar to the signals of FIGS. 8a and 8b and cause a desired magnitude and frequency of vibration as determined by the methods of FIGS. 6 and 7. The control signals can be adjusted with other parameters, if desired, such as duration, envelopes (as described in U.S. Pat. No. 5,959,613, incorporated herein by reference in its entirety), etc.

After the desired are determined, then the control signals are then further modified to provide the directionality or "balance" described below. In graph 314 of FIG. 10c, control signal 322 is reduced in on-time to provide less average current to a first actuator assembly, while in graph 316 of FIG. 10d, control signal 324 is increased in on-time by the same amount that control signal 322 is reduced to provide a greater average current to a second actuator assembly. Thus, a first actuator assembly is provided with an additional amount of power while the second actuator is provided with less power, by the amount of additional power supplied to the first actuator. For example, control signal 324 has a greater duty cycle, e.g. increased by 25%, thus providing the actuator with more power and causing stronger vibrations to be output. Control signal 322 has a lower duty cycle by a corresponding amount (25%), causing lower magnitude vibrations to be output from that actuator, so that the full 100% of commanded magnitude has been differently distributed between the two actuator assemblies.

Thus, the magnitudes of the vibrations are scaled by dividing the commanded magnitude between the two actuator assemblies 202 and 204. To provide a vibration or other inertial force sensation that has no perceived direction to the user, both actuator assemblies are provided with an equal amount of power (average current), so that equal magnitude vibrations are output from each actuator, as in FIGS. 10a–10b. If, however, the inertial sensation is to have a perceived direction, then the on-times of the control signals are adjusted, i.e. one actuator is provided with more average current than the other, and greater magnitude inertial forces are output by one actuator than the other actuator. If control signal 324 is applied to the actuator assembly 204 on the left of the gamepad device 200, then a left direction is to be perceived by the user since the left vibration has a greater magnitude. If a right direction is to be output, then the actuator 202 on the right side of the device is provided with the greater amount of average current. The user perceives a stronger vibration on one side of the device as a directional vibration. If for example, the user's vehicle in a game crashes into a barrier on the left, the left actuator can output a stronger vibration to indicate the direction of this collision.

Depending on the division of commanded magnitude between the two actuators, the user perceives the output inertial sensations at a location somewhere between the two actuator assemblies, where the stronger one force is, the closer to that actuator assembly the user perceives the resultant force to be output. This is similar to the locations illustrated in FIG. 4 above. One way to command the direction in this way is to specify a "balance" parameter, as described above, or have the host directly command the actuator assemblies. Additional actuators can also be implemented in embodiment 200 similar to the embodiment 100 described above, and a sweep effect can be commanded and output using the embodiment 200.

Figure 11:
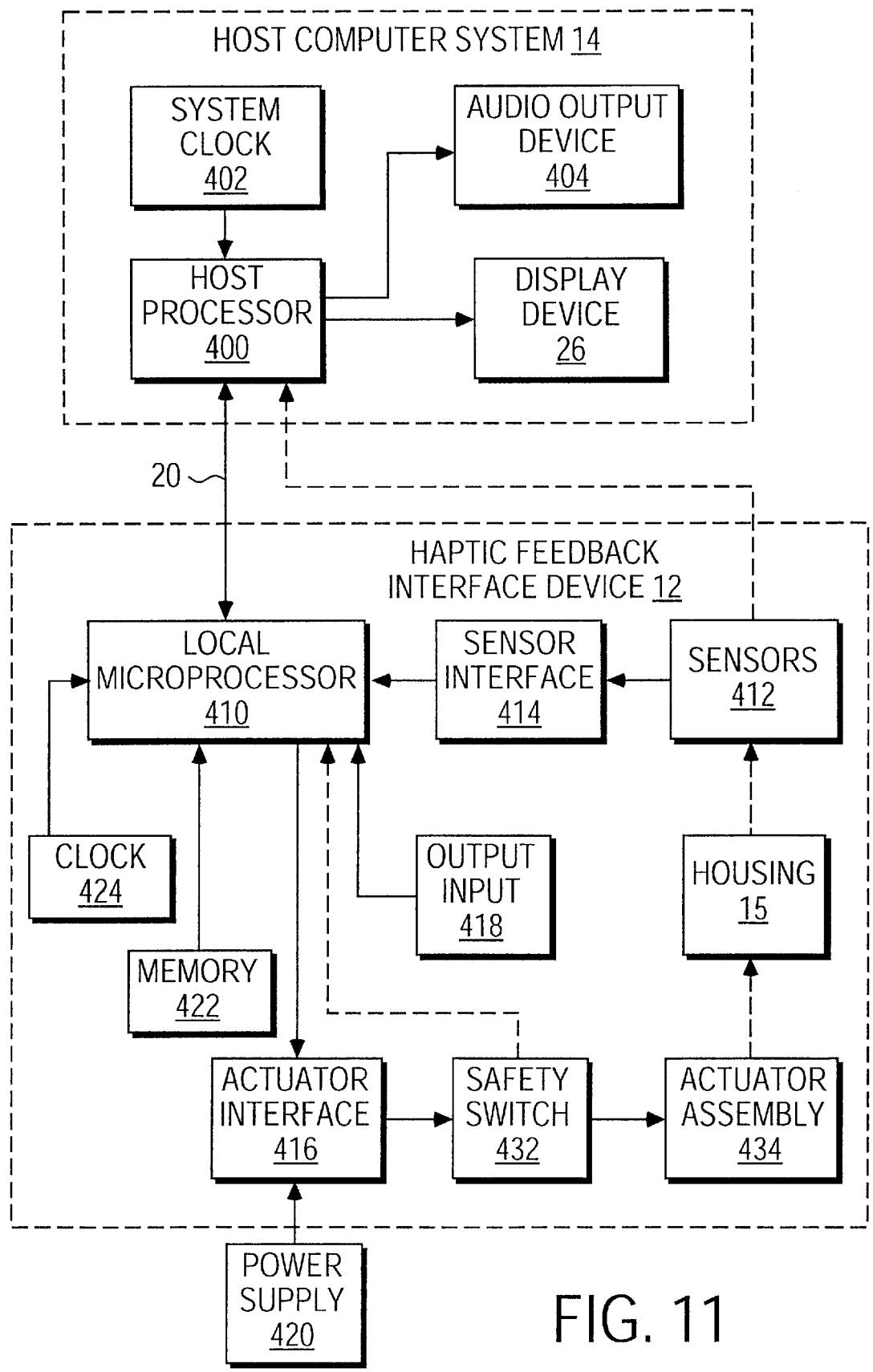
FIG. 11 is a block diagram illustrating one embodiment of a haptic feedback system suitable for use with the present inventions.

FIG. 11 is a block diagram illustrating one embodiment of a haptic feedback system suitable for use with the present inventions.

Host computer system 14 preferably includes a host microprocessor 400, a clock 402, a display screen 26, and an audio output device 404. The host computer also includes other well known components, such as random access memory (RAM), read-only memory (ROM), and input/output (I/O) electronics (not shown). Display screen 26 displays images of a game environment, operating system application, simulation, etc. and audio output device 404, such as speakers, provides sound output to user. Other types of peripherals can also be coupled to host processor 400, such as storage devices (hard disk drive, CD ROM drive, floppy disk drive, etc.), printers, and other input and output devices.

The interface device 12, such as a mouse, gamepad, etc., is coupled to host computer system 14 by a bi-directional bus 20 The bi-directional bus sends signals in either direction between host computer system 14 and the interface device. Bus 20 can be a serial interface bus, such as an RS232 serial interface, RS-422, Universal Serial Bus (USB), MIDI, or other protocols well known to those skilled in the art; or a parallel bus or wireless link. Some interfaces can also provide power to the actuators of the device 12.

Device 12 can include a local microprocessor 410. Local microprocessor 410 can optionally be included within the housing of device 12 to allow efficient communication with other components of the mouse. Processor 410 is considered local to device 12, where "local" herein refers to processor 410 being a separate microprocessor from any processors in host computer system 14. "Local" also preferably refers to processor 410 being dedicated to haptic feedback and sensor I/O of device 12. Microprocessor 410 can be provided with software instructions to wait for commands or requests from computer host 14, decode the command or request, and handle/control input and output signals according to the command or request. In addition, processor 410 can operate independently of host computer 14 by reading sensor signals and calculating appropriate forces from those sensor signals, time signals, and stored or relayed instructions selected in accordance with a host command. Suitable microprocessors for use as to local microprocessor 410 include the MC68HC711E9 by Motorola, the PIC16C74 by Microchip, and the 82930AX by Intel Corp., for example, as well as more sophisticated force feedback processors such as the Immersion Touchsense Processor. Microprocessor 410 can include one microprocessor chip, multiple processors and/or co-processor chips, and/or digital signal processor (DSP) capability.

Microprocessor 410 can receive signals from sensor(s) 412 and provide signals to actuator assembly 54 in accordance with instructions provided by host computer 14 over bus 20. For example, in a local control embodiment, host computer 14 provides high level supervisory commands to microprocessor 410 over bus 20, and microprocessor 410 decodes the commands and manages low level force control loops to sensors and the actuator in accordance with the high level commands and independently of the host computer 14. This operation is described in greater detail in U.S. Pat. Nos. 5,739,811 and 5,734,373, both incorporated herein by reference. In the host control loop, force commands are output from the host computer to microprocessor 410 and instruct the microprocessor to output a force or force sensation having specified characteristics. The local microprocessor 410 reports data to the host computer, such as locative data that describes the position of the mouse in one or more provided degrees of freedom. The data can also describe the states of buttons 24, d-pad 20, etc. The host computer uses the data to update executed programs. In the local control loop, actuator signals are provided from the microprocessor 410 to actuator assembly 434 and sensor signals are provided from the sensor 412 and other input devices 418 to the microprocessor 410. Herein, the term "haptic sensation" or "tactile sensation" refers to either a single force or a sequence of forces output by the actuator assemblies which provide a sensation to the user. The microprocessor 410 can process inputted sensor signals to determine appropriate output actuator signals by following stored instructions. The microprocessor may use sensor signals in the local determination of forces to be output on the user object, as well as reporting locative data derived from the sensor signals to the host computer.

In yet other embodiments, other simpler hardware can be provided locally to device 12 to provide functionality similar to microprocessor 410. For example, a hardware state machine incorporating fixed logic can be used to provide signals to the actuator assembly 434 and receive sensor signals from sensors 412, and to output tactile signals according to a predefined sequence, algorithm, or process. Techniques for implementing logic with desired functions in hardware are well known to those skilled in the art.

In a different, host-controlled embodiment, host computer 14 can provide low-level force commands over bus 20, which are directly transmitted to the actuator assemblies 434 via microprocessor 410 or other (e.g. simpler) circuitry. Host computer 14 thus directly controls and processes all signals to and from the device 12.

In a simple host control embodiment, the signal from the host to the device can be a single bit that indicates whether to pulse the actuator at a predefined frequency and magnitude. In more complex embodiments, the signal from the host can include a magnitude, giving the strength of the desired pulse, and/or a direction, giving both a magnitude and a sense for the pulse. In more complex embodiments, a local processor can be used to receive a simple command from the host that indicates a desired force value to apply over time, which the microprocessor then outputs based on the one command. In a more complex embodiment, a high-level command with tactile sensation parameters can be passed to the local processor on the device which can then apply the full sensation independent of host intervention. A combination of these methods can be used for a single device 12.

Local memory 422, such as RAM and/or ROM, is preferably coupled to microprocessor 410 in mouse 12 to store instructions for microprocessor 410 and store temporary and other data. For example, force profiles can be stored in memory 422, such as a sequence of stored force values that can be output by the microprocessor, or a look-up table of force values to be output based on the current position of the user object. In addition, a local clock 424 can be coupled to the microprocessor 410 to provide timing data, similar to the system clock of host computer 12; the timing data might be required, for example, to compute forces output by actuator assembly 434 (e.g., forces dependent on calculated velocities or other time dependent factors). In embodiments using the USB communication interface, timing data for microprocessor 410 can be alternatively retrieved from the USB signal.

The microprocessor can be provided with the necessary instructions or data to check sensor readings, determine cursor and target positions, and determine output forces independently of host computer 14. The host can implement program functions (such as displaying images) when appropriate, and synchronization commands can be communicated between the microprocessor and host 14 to correlate the microprocessor and host processes. Also, the local memory can store predetermined force sensations for the microprocessor that are to be associated with particular types of graphical objects. Alternatively, the computer 14 can directly send haptic feedback signals to the device 12 to generate tactile sensations.

Sensors 412 sense the position or motion of the device and/or one or more manipulandums or controls and provides signals to microprocessor 410 (or host 14) including information representative of the position or motion. Sensors suitable for detecting manipulation include digital optical encoders, optical sensor systems, linear optical encoders, potentiometers, optical sensors, velocity sensors, acceleration sensors, strain gauge, or other types of sensors can also be used, and either relative or absolute sensors can be provided. Optional sensor interface 414 can be used to convert sensor signals to signals that can be interpreted by the microprocessor 410 and/or host computer system 14, as is well known to those skilled in the art.

Actuator assemblies 434 transmit forces to the housing of the device 12 as described above in response to signals received from microprocessor 410 and/or host computer 14. Actuator assembly 434 is provided to generate inertial forces by, for example, moving an inertial mass. Other types of actuators can also be used, such as actuators that drive a member against the housing to generate a tactile sensation.

Actuator interface 416 can be optionally connected between actuator assemblies 434 and microprocessor 410 to convert signals from microprocessor 410 into signals appropriate to drive actuator assembly 434. Interface 416 can include power amplifiers, switches, digital to analog controllers (DACs), analog to digital controllers (ADCs), and other components, as is well known to those skilled in the art. Other input devices 418 are included in device 12 and send input signals to microprocessor 410 or to host 14 when manipulated by the user. Such input devices include buttons 24, d-pad 20, etc. and can include additional buttons, dials, switches, scroll wheels, or other controls or mechanisms.

Power supply 420 can optionally be included in device 12 coupled to actuator interface 416 and/or actuator assembly 434 to provide electrical power to the actuator, or be provided as a separate component. Alternatively, power can be drawn from a power supply separate from device 12, or be received across the bus 20. Also, received power can be stored and regulated by device 12 and thus used when needed to drive actuator assemblies 434 or used in a supplementary fashion. Some embodiments can use a power storage device in the device to ensure that peak forces can be applied (as described in U.S. Pat. No. 5,929,607, incorporated herein by reference). Alternatively, this technology can be employed in a wireless device, in which case battery power is used to drive the tactile actuators. A safety switch 432 can optionally be included to allow a user to deactivate actuator assemblies 434 for safety reasons.

While this invention has been described in terms of several preferred embodiments, it is contemplated that alterations, permutations and equivalents thereof will become apparent to those skilled in the art upon a reading of the specification and study of the drawings. For example, many different embodiments of haptic feedback devices can be used to output the tactile sensations described herein, including joysticks, steering wheels, gamepads, and remote controls. Furthermore, certain terminology has been used for the purposes of descriptive clarity, and not to limit the present invention.

What is claimed is:

1. A method, comprising:
    generating a first control signal and a second control signal, the first control signal having a period substantially identical to a period of the second control signal, the first control signal having a magnitude different from a magnitude of the second control signal; and
    outputting the first control signal and the second control signal respectively to a first actuator and a second actuator at substantially the same time,
the first actuator configured to output a first haptic sensation responsive to the first control signal, the second actuator configured to output a second haptic sensation responsive to the second control signal, wherein the magnitude of the first control signal relates to the magnitude of the second control signal according to a predetermined ratio.

2. A method as recited in claim 1, wherein the predetermined ratio is associated with a spatial relationship between the first actuator and a second actuator.

3. A method as recited in claim 1, further comprising receiving a high level command including a balance parameter, the predetermined ratio being associated with the balance parameter.

4. A method as recited in claim 3, wherein the balance parameter is configured to change dynamically so as to cause the first haptic sensation and the second haptic sensation to impart a sweeping haptic effect.

5. A method as recited in claim 4, wherein the sweeping haptic effect is correlated with at least one of a sound effect and a visual effect.

6. A method as recited in claim 4, wherein the magnitude of the first control signal is associated with a first current applied to the first actuator, the magnitude of the second control signal is associated with a second current applied to the second actuator, the method further comprising dynamically varying the first current and the second current in accordance with the balance parameter.

7. A method, comprising:
    generating a first control signal and a second control signal, the first control signal having a duty cycle different from a duty cycle of the second control signal;
    outputting the first control signal to a first actuator, the first actuator configured to output a first haptic sensation responsive to the first control signal; and
    outputting the second control signal to a second actuator, the second actuator configured to output a second haptic sensation responsive to the second control signal, wherein the duty cycle of the first control signal relates to the duty cycle of the second control signal according to a predetermined ratio.

8. A method as recited in claim 7, wherein the predetermined ratio is associated with a spatial relationship between the first actuator and a second actuator.

9. A method as recited in claim 7, further comprising receiving a high level command including a balance parameter, the predetermined ratio being associated with the balance parameter.

10. A method as recited in claim 9, wherein the balance parameter is configured to change dynamically so as to cause the first haptic sensation and the second haptic sensation to impart a sweeping haptic effect.

11. A method as recited in claim 10, wherein the sweeping haptic effect is correlated with at least one of a sound effect and a visual effect.

12. An apparatus, comprising:
    a processor;
    a first actuator configured to receive a first control signal from the processor and output a first haptic sensation; and
    a second actuator configured to receive a second control signal from the processor and output a second haptic sensation,
the first control signal having a period substantially identical to a period of the second control signal, the first control signal having a magnitude different from a magnitude of the second control signal, the processor configured to output the first control signal and the second control signal respectively to the first actuator and the second actuator at substantially the same time, wherein the magnitude of the first control signal relates to the magnitude of the second control signal according to a predetermined ratio.

13. An apparatus as recited in claim 12, wherein the predetermined ratio is associated with a spatial relationship between the first actuator and a second actuator.

14. An apparatus as recited in claim 12, wherein the processor is configured to receive a high level command including a balance parameter, the predetermined ratio being associated with the balance parameter.

15. An apparatus as recited in claim 14, wherein the balance parameter is configured to change dynamically so as to cause the first haptic sensation and the second haptic sensation to impart a sweeping haptic effect.

16. An apparatus as recited in claim 15, wherein the sweeping haptic effect is correlated with at least one of a sound effect and a visual effect.

17. An apparatus as recited in claim 15, wherein the magnitude of the first control signal is associated with a first current applied to the first actuator, and the magnitude of the second control signal is associated with a second current applied to the second actuator, the first current and the second current configured to change dynamically in accordance with the balance parameter.

18. An apparatus, comprising:
    a processor;
    a first actuator configured to receive a first control signal from the processor and to output a first haptic sensation; and
    a second actuator configured to receive a second control signal from the processor and output a second haptic sensation,
the first control signal having a duty cycle different from a duty cycle of the second control signal, wherein the duty cycle of the first control signal relates to the duty cycle of the second control signal according to a predetermined ratio.

19. An apparatus as recited in claim 18, wherein the predetermined ratio is associated with a spatial relationship between the first actuator and a second actuator.

20. An apparatus as recited in claim 18, wherein the processor is configured to receive a high level command including a balance parameter, the predetermined ratio being associated with the balance parameter.

21. An apparatus as recited in claim 20, wherein the balance parameter is configured to change dynamically so as to cause the first haptic sensation and the second haptic sensation to impart a sweeping haptic effect.

22. An apparatus as recited in claim 21, wherein the sweeping haptic effect is correlated with at least one of a sound effect and a visual effect.

23. A computer-readable medium on which is encoded program code, comprising:

program code for generating a first control signal and a second control signal, the first control signal having a period substantially identical to a period of the second control signal, the first control signal having a magnitude different from a magnitude of the second control signal; and program code for outputting the first control signal and the second control signal respectively to a first actuator and a second actuator at substantially the same time, the first actuator configured to output a first haptic sensation responsive to the first control signal, the second actuator configured to output a second haptic sensation responsive to the second control signal, wherein the magnitude of the first control signal relates to the magnitude of the second control signal according to a predetermined ratio.

24. A computer-readable medium as recited in claim 23, further comprising program code for receiving a high level command including a balance parameter, the predetermined ratio being associated with the balance parameter.

25. A computer-readable medium as recited in claim 24, wherein the balance parameter is configured to change dynamically so as to cause the first haptic sensation and the second haptic sensation to impart a sweeping haptic effect.

26. A computer-readable medium on which is encoded program code, comprising:

program code for generating a first control signal and a second control signal, the first control signal having a duty cycle different from a duty cycle of the second control signal;

program code for outputting the first control signal to a first actuator, the first actuator configured to output a first haptic sensation responsive to the first control signal; and program code for outputting the second control signal to a second actuator, the second actuator configured to output a second haptic sensation responsive to the second control signal, wherein the duty cycle of the first control signal relates to the duty cycle of the second control signal according to a predetermined ratio.

27. A computer-readable medium as recited in claim 26, further comprising program code for receiving a high level command including a balance parameter, the predetermined ratio being associated with the balance parameter.

28. A computer-readable medium as recited in claim 27, wherein the balance parameter is configured to change dynamically so as to cause the first haptic sensation and the second haptic sensation to impart a sweeping haptic effect.

* * * * *